United States Patent
Jinno et al.

(10) Patent No.: US 8,311,992 B2
(45) Date of Patent: Nov. 13, 2012

(54) INFORMATION PROCESSING DEVICE AND DATA SHREDDING METHOD

(75) Inventors: Taichi Jinno, Odawara (JP); Nobuyuki Saika, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 150 days.

(21) Appl. No.: 12/679,072

(22) PCT Filed: Feb. 23, 2010

(86) PCT No.: PCT/JP2010/001192
§ 371 (c)(1),
(2), (4) Date: Mar. 19, 2010

(87) PCT Pub. No.: WO2011/104742
PCT Pub. Date: Sep. 1, 2011

(65) Prior Publication Data
US 2011/0289060 A1   Nov. 24, 2011

(51) Int. Cl.
*G06F 17/30* (2006.01)
(52) U.S. Cl. ........................................ 707/687
(58) Field of Classification Search ............... 707/687
See application file for complete search history.

(56) References Cited

U.S. PATENT DOCUMENTS

| | | | |
|---|---|---|---|
| 7,216,207 B1 * | 5/2007 | Armstrong-Crews et al. | 711/159 |
| 7,376,062 B2 * | 5/2008 | Hsu et al. | 369/53.24 |
| 7,469,327 B2 * | 12/2008 | Kawamura et al. | 711/163 |
| 7,739,462 B2 * | 6/2010 | Dewey | 711/159 |
| 7,873,870 B2 * | 1/2011 | Ohara | 714/16 |
| 2006/0036663 A1 | 2/2006 | Kwon | |
| 2006/0095688 A1 * | 5/2006 | Kawamura et al. | 711/152 |
| 2006/0117136 A1 | 6/2006 | Tran et al. | |
| 2007/0047395 A1 * | 3/2007 | Skeeter et al. | 369/30.04 |
| 2008/0030755 A1 * | 2/2008 | Kortenoeven et al. | 358/1.9 |
| 2008/0232593 A1 * | 9/2008 | Hsu et al. | 380/277 |
| 2009/0052665 A1 * | 2/2009 | Goodman et al. | 380/44 |
| 2009/0100235 A1 | 4/2009 | Fukuguchi | |
| 2010/0077256 A1 * | 3/2010 | Ohara | 714/16 |
| 2011/0107144 A1 * | 5/2011 | Ohara | 714/16 |

FOREIGN PATENT DOCUMENTS

| | | |
|---|---|---|
| JP | 2009-098887 | 5/2009 |
| WO | 2007 044250 A2 | 4/2007 |

* cited by examiner

*Primary Examiner* — Sheree Brown
(74) *Attorney, Agent, or Firm* — Brundidge & Stanger, P.C.

(57) ABSTRACT

An object is to achieve efficient shredding of recording media.

For a storage system 10 which accepts a data input/output request transmitted in units of files from the client device 2 and includes a recording medium (hard disk drives 171) for storing in units of data blocks a file entity specified by the received data input/output request, in the information processing device (server device 3) performing data write or read, for shredding data blocks including a recording medium, from the files stored in the recording medium, a file whose update frequency exceeds the previously set threshold is selected and the selected entity file is stored in the data block to realize pseudo shredding for the data block.

2 Claims, 26 Drawing Sheets

INFORMATION PROCESSING SYSTEM 1

SHREDDING REQUEST INSTRUCTION SCREEN 850

| FILE SYSTEM NAME:FS1 ||
|---|---|
| SEARCH CONDITION | SEARCH RESULT:/user/taro |
| FILE NAME<br><br>UPDATE DATE<br><br>SIZE<br><br>[SEARCH] | SEARCH RESULT:<br>FILE NAME  SIZE    UPDATE DATE<br>File1        100kB  2009/4/5 12:00:05<br>File2        140kB  2009/4/3 11:00:00<br>File3        200kB  2009/5/6 18:30:00<br><br>[TRANSMIT REQUEST] |

Fig. 10A

FILE ACCESS LOG — 921

| DATE AND TIME | FILE PATH NAME | OPERATION | USER NAME |
|---|---|---|---|
| 2009/5/14 10:15:00 | /File-1.txt | read | user01 |
| 2009/5/14 11:12:23 | /Holder-1/File-3.txt | write | user02 |
| ⋮ | ⋮ | ⋮ | ⋮ |
| 2009/5/15 23:12:23 | /Holder-2/File-5.txt | write | user-0X |

ACTUAL SHREDDING WAITING BITMAP

| BLOCK ADDRESS (9221) | ACTUAL SHREDDING WAITING FLAG (9222) |
|---|---|
| 0 | 1 |
| 1 | 1 |
| 2 | 0 |

ONGOING PSEUDO SHREDDING BITMAP

| BLOCK ADDRESS (9231) | IN PROCESS OF PSEUDO SHREDDING (9232) |
|---|---|
| 0 | 1 |
| 1 | 0 |
| 2 | 0 |

PSEUDO SHREDDING USE FILE MANAGEMENT TABLE

| FILE PATH NAME (9241) | IN-USE FLAG (9242) |
|---|---|
| /home/log.txt | 1(USED) |
| /home/log2.txt | 0(UNUSED) |
| /home/log3.txt | 0(UNUSED) |

924 u→ user, g → group, o → ABBREVIATION OF OTHER (OTHER THAN USER)
r→ read, x → execute, w → ABBREVIATION OF WRITE

Fig. 13

DIRECTORY ENTRY 1300

| FILE PATH NAME | inode NUMBER |
|---|---|
| /home/user-01/・・・/a.txt | 100 |
| /home/user-02/・・・/b.txt | 200 |
| : | : |

1311 — FILE PATH NAME
1312 — inode NUMBER

Fig. 25

| DATE AND TIME | FILE PATH NAME | OPERATION | USER NAME |
|---|---|---|---|
| 2009/5/14 10:15:00 | /home/log.txt | write | system |
| 2009/5/14 11:12:23 | /home/log.txt | write | system |
| ... | ... | ... | ... |
| 2009/5/14 11:15:00 | /home/log.txt | write | system |
| 2009/5/14 12:14:00 | /home/log.txt | write | system |
| ... | ... | ... | ... |
| 2009/5/14 12:15:00 | /home/log.txt | write | system |

921

INFORMATION PROCESSING DEVICE AND DATA SHREDDING METHOD

TECHNICAL FIELD

The present invention relates to an information processing device and a data shredding method, and in particular to a technology to enable shredding of recording media efficiently.

BACKGROUND ART

In a recording device using magnetic recording media such as hard disk drives and the like, even if a file delete command or data block delete command prepared in an operating system or the like is issued and the deletion processing is performed, as traces of data are left due to remaining magnetism, there is possibility that the information thought to have been deleted may be read by a third party. In order to prevent stealing of data and the like using remaining magnetism by a third party in a more reliable manner, a so-called shredding that repeats writing of data consisting of fixed values or random values in the same storage area needs to be performed.

As for shredding, PTL 1, for example, discloses that, in order to reliably prevent information leakage, the maximum number of overwriting and the number of overwriting of overwrite data on the disk cache in the server is managed, the maximum number of overwriting and the number of overwriting of overwrite data transmitted from the server on the controller cache in the storage subsystem is managed, and each of the addresses of the disk cache, the controller cache, and the hard disk drive storing a same file as the deletion target are managed so that the data as the erase target in the file as the erase target stored in each of the disk cache, the controller cache, and the hard disk drive is deleted in units of files.

CITATION LIST

Patent Literature

PTL 1: Japanese Patent Application Laid-Open Publication No. 2009-98887

SUMMARY OF INVENTION

Technical Problem

Meanwhile, as mentioned above, data consisting of fixed values or random values needs to be written repeatedly in the same storage area for shredding, so that the processing requires a considerable amount of time, and the load on the server device and the storage system performing this processing also increases. Specifically, in an environment where a large number of storage systems dealing with an enormous amount of data are operated, such as a data center operating an information processing system used for providing information processing services in firms and the like and for operating Web services developed on the internet, the target of shredding is enormous, so the time required for shredding and the processing load caused by shredding become problems.

The present invention has been conceived in view of the above-mentioned background, and the main of the present invention is to provide an information processing device and a data shredding method capable of performing shredding efficiently.

Solution to Problem

One aspect of this invention for achieving the above-mentioned purpose is assumed to be an information processing system that receives a data I/O request in units of files, and performs writing or reading of data to/from a storage system that includes a recording medium storing therein a file entity specified as the data I/O request received in units of data blocks, the information processing system comprising a processing part, during shredding of a specific data block of the recording medium, selecting a file whose update frequency exceeds a preset threshold value from files stored in the recording medium, and performing pseudo shredding on the data block by storing a selected file entity in the data block.

According to the present invention, when performing shredding for a certain data block in a recording medium by repeatedly writing and the like of data consisting of fixed values or random values (hereinafter referred to as actual shredding), pseudo shredding due to file updates (hereinafter referred to as pseudo shredding) is performed by storing the entity of the file whose update frequency is high in the data block as the target of shredding. Therefore, even if a large number of requests for actual shredding are made and the number of waiting requests increases, shredding can be performed efficiently without waiting for actual shredding to be performed. Furthermore, security of data from an issuance of request for actual shredding until the actual shredding can be ensured as pseudo shredding is performed in parallel with the actual shredding.

Other problems disclosed in this specification and solutions therefor will become clear in the following description of the preferred embodiments with reference to the accompanying drawings.

Advantageous Effects of Invention

According to the present invention, shredding of recording media can be performed efficiently, and security of data can be improved.

BRIEF DESCRIPTION OF DRAWINGS

FIG. 10A is an example of a file access log 921.

FIG. 10B is an example of an actual shredding waiting bitmap 922.

FIG. 10C is an example of an ongoing pseudo shredding bitmap 923.

FIG. 10D is an example of pseudo shredding use file management table 924.

FIG. 13 is an example of a directory entry 1300.

FIG. 25 is an example of a file access log 921.

DESCRIPTION OF EMBODIMENTS

Figure 1:
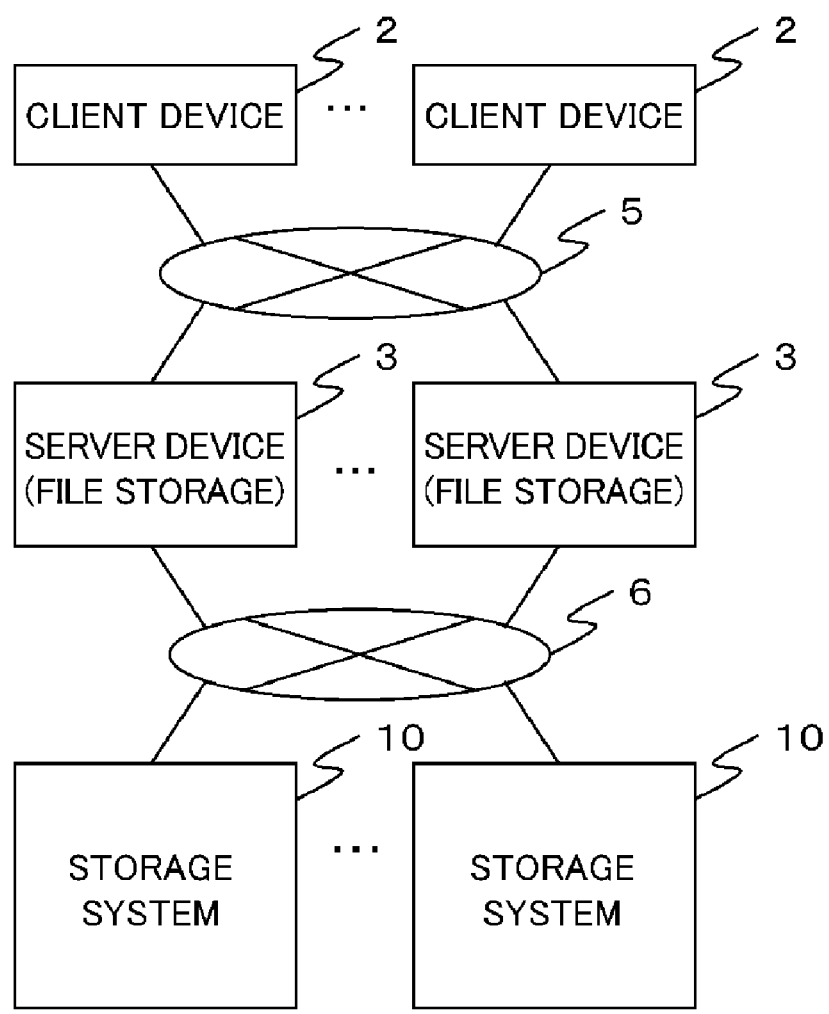
FIG. 1 shows a schematic configuration of an information processing system 1.

An embodiment will be described below with reference to the accompanying drawings. FIG. 1 shows a schematic configuration of an information processing system 1 described as an embodiment. As shown in the figure, the information processing system 1 is configured of one or more server devices 3 (file storages), one or more storage systems 10, and one or more client devices 2. Among these, the client devices 2 and the server devices 3 are communicatively coupled via the communication network 5. The server devices 3 and the storage systems 10 are communicatively coupled via the storage network 6.

The communication network 5 is LAN (Local Area Network), WAN (Wide Area Network), the internet, a public line, a private line, and the like. The storage network 6 is a LAN (Local Area Network), WAN (Wide Area Network), SAN (Storage Area Network), the internet, a public line, a private line, and the like. Communication via the communication network 5 or the storage network 6 is performed in accordance with a protocol of, for example, TCP/IP, iSCSI (internet Small Computer System Interface), the Fibre Channel Protocol, FICON (Fibre Connection) (registered trademark), ESCON (Enterprise System Connection) (registered trademark), ACONARC (Advanced Connection Architecture) (registered trademark), FIBARC (Fibre Connection Architecture) (registered trademark), and the like.

The client device 2 is an information processing device using a storage area provided by the storage system 10 via the server device 3, which is, for example, a personal computer, an office computer and the like. A file system, an Operating System realized by executing a software module such as a kernel or a driver and the like, and various types of application and the like function in the client device 2.

Figure 2:
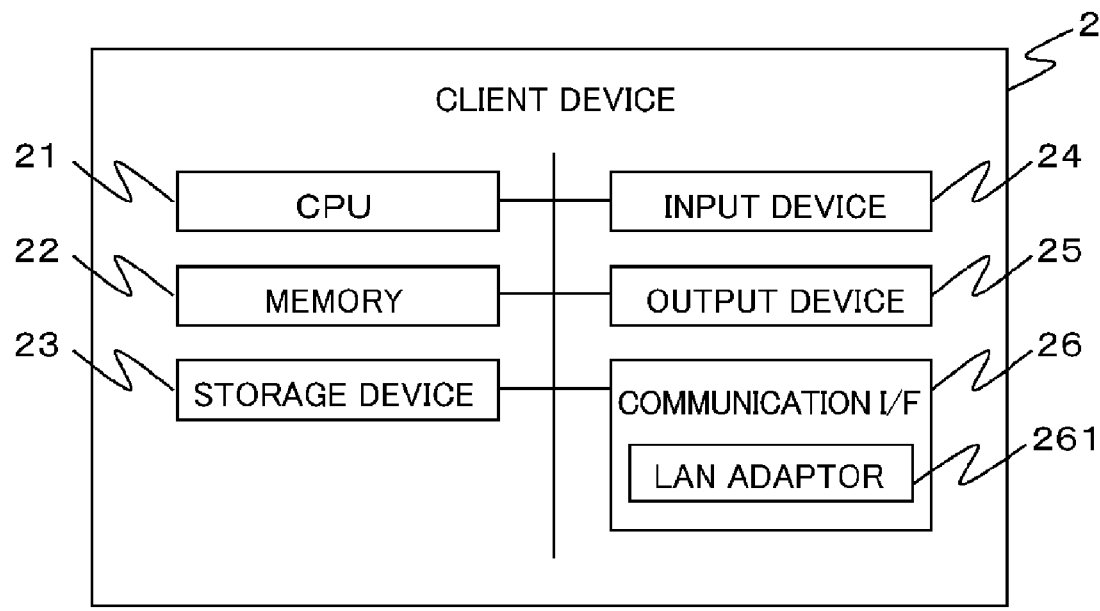
FIG. 2 is an example of a hardware configuration of a client device 2.

FIG. 2 shows an example of the hardware of the information processing device (computer) which can be utilized as a client device 2. As shown in FIG. 2, this device includes a CPU 21, a volatile or non-volatile memory 22 (RAM or ROM), a storage device 23 (e.g. a hard disk drive or a semiconductor storage device (SSD (Solid State Drive)), an input device 24 such as a keyboard or a mouse, an output device 25 such as a liquid crystal display or a printer, and a communication interface (hereinafter referred to as a communication I/F 26) such as an NIC (Network Interface Card) (hereinafter referred to as a LAN adapter 261).

The server device 3 is an information processing device (computer) utilizing the storage area (data storage area) provided by the storage system 10. The server device 3 is configured with a personal computer, a Mainframe, an office computer, and the like. The server device 3, for accessing the above-mentioned storage area, transmits a data frame (hereinafter abbreviated to a frame) including a data I/O request (data write request, data read request, and the like) to the storage system 10.

Figure 3:
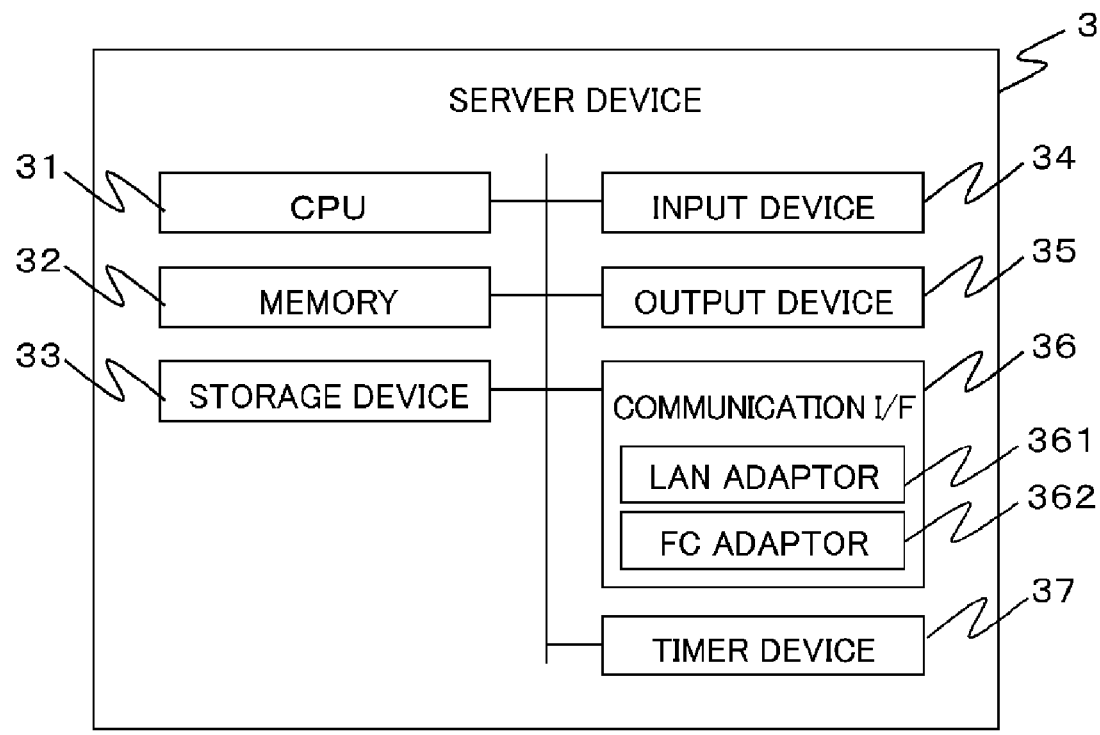
FIG. 3 is an example of a hardware configuration of a server device 3.

FIG. 3 shows an example of hardware of an information processing device (computer) which can be utilized as a server device 3. As shown in FIG. 3, this device includes a CPU 31, a volatile or non-volatile memory 32 (RAM or ROM), a storage device 33 (e.g. a hard disk drive or a semiconductor storage device (SSD)), an input device 34 such as a keyboard or a mouse, an output device 35 such as a liquid crystal display or a printer and the like, a communication interface (hereinafter referred to as a communication I/F 36) such as an NIC (hereinafter referred to as a LAN adapter 361) or an HBA (hereinafter referred to as an FC adapter 362), and a timer device 37 configured with a timer circuit, an RTC (Real Time Clock) and the like.

Figure 4:
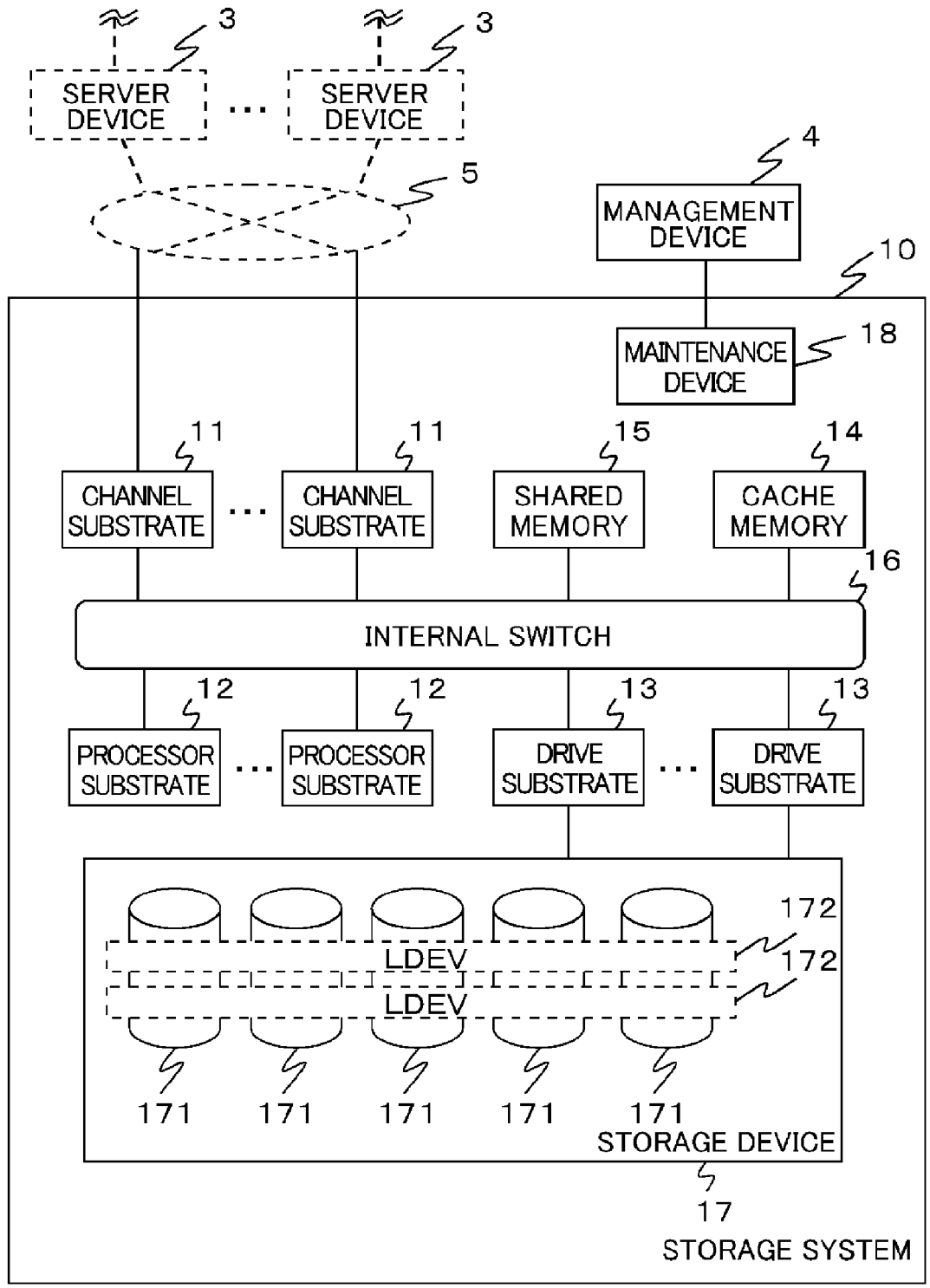
FIG. 4 is an example of a hardware configuration of a storage system 10.

FIG. 4 shows an example of the hardware configuration of the storage system 10. The storage system 10 is, for example, a disk array device. The storage system 10, in response to the above-mentioned I/O request transmitted from the server device 3, accesses a recording medium, and transmits data or a response to the server device 3. As shown in FIG. 4, this storage system 10 includes one or more channel substrates 11, one or more processor substrates 12 (Micro Processors), one or more drive substrates 13, a Cache Memory 14, a Shared Memory 15, an internal switch 16, a storage device 17, and a maintenance device 18 (SVP: SerVice Processor). The channel substrates 11, the processor substrates 12, the drive substrates 13, the cache memory 14, and the shared memory 15 are communicatively coupled to one another via the internal switch 16.

The channel substrate 11 receives a frame transmitted from the server device 3, and transmits a frame including the response on the processing for the data I/O request included in the received frame (e.g. the data which was read, a read completion report, or a write completion report) to the server device 3. Note that the description below assumes the frame to be a Fibre Channel frame (FC frame).

The processor substrate 12, in response to the above-mentioned data I/O request included in the frame received by the channel substrate 11, performs processing relating to data transfer among the channel substrate 11, the drive substrate 13, and the cache memory 14. The processor substrate 12 passes data (data read from the storage device 17, data written to the storage device 17) between the channel substrate 11 and the drive substrate 13 performed via the cache memory 14, staging (reading data from the storage device 17) or destaging (writing data to the storage device 17) of data stored in the cache memory 14, and the like.

The cache memory 14 is configured with a RAM (Random Access Memory) capable of high-speed access. The cache memory 14 stores therein data to be written to the storage device 17 (hereinafter referred to as write data), data read from the storage device 17 (hereinafter referred to as read data) and the like. The shared memory 15 stores therein various types of information used for controlling the storage system 10.

The drive substrate 13 communicates with the storage device 17 when reading data from the storage device 17 and writing data to the storage device 17. The internal switch 16 is configured, for example, using a high-speed crossbar switch. Communication via the internal switch 16 is performed in accordance with a protocol such as a Fibre Channel protocol, iSCSI, TCP/IP, and the like.

The storage device 17 is configured to include a plurality of storage drives 171. The type of storage drives 171 are, for example, hard disk drives of SAS (Serial Attached SCSI), SATA (Serial ATA), FC (Fibre Channel), PATA (Parallel ATA), SCSI and the like or semiconductor storage devices (SSDs).

The storage device 17 provides a storage area in units of logical storage areas provided by controlling the storage drives 171 by methods of RAID (Redundant Array of Inexpensive (or Independent) Disks) and the like. This logical storage area is, for example, a logical device (LDEV 172) configured with a RAID group (Parity Group). Meanwhile, the storage system 10 provides a logical storage area (hereinafter referred to as an LU (Logical Unit, a Logical Volume, or a logical volume) configured with LDEVs 172 to the server device 3. The storage system 10 manages the correspondence (relationship) between LUs and LDEVs 172 and, with reference to this correspondence, identifies the LDEVs 172 corresponding with the LUs or identifies the LUs corresponding to the LDEVs 172.

Figure 5A:
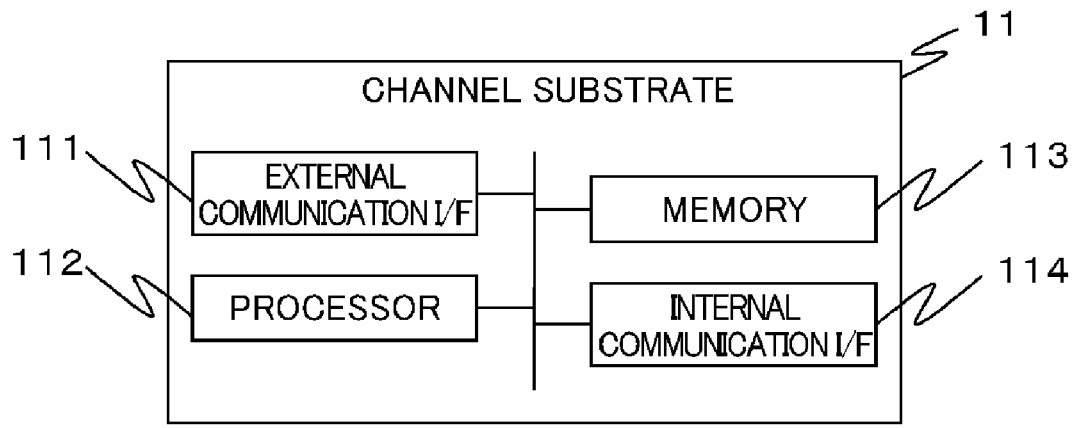
FIG. 5A is an example of a hardware configuration of a channel substrate 11.

FIG. 5A shows a hardware configuration of a channel substrate 11. As shown in FIG. 5A, the channel substrate 11 includes an external communication interface having a port (communication port) for communication with the server device 3 (hereinafter referred to as an external communication I/F 111), a processor 112 (including a frame processing chip and a frame transfer chip described later), a memory 113, an internal communication interface having a port (communication port) for communication with the processor substrate 12 (hereinafter referred to as an internal communication I/F 114).

The external communication I/F 111 is configured with an NIC (Network Interface Card), an HBA (Host Bus Adapter), and the like. The processor 112 is configured with a CPU (Central Processing Unit), an MPU (Micro Processing Unit), and the like. The memory 113 is a RAM (Random Access Memory) or a ROM (Read Only Memory). The memory 113 stores therein a microprogram. By the processor 112 reading the above-mentioned microprogram from the memory 113 and performing the same, various types of functions provided by the channel substrate 11 are realized. The internal communication I/F 114 communicates with the processor substrate 12, the drive substrate 13, the cache memory 14, and the shared memory 15 via the internal switch 16.

Figure 5B:
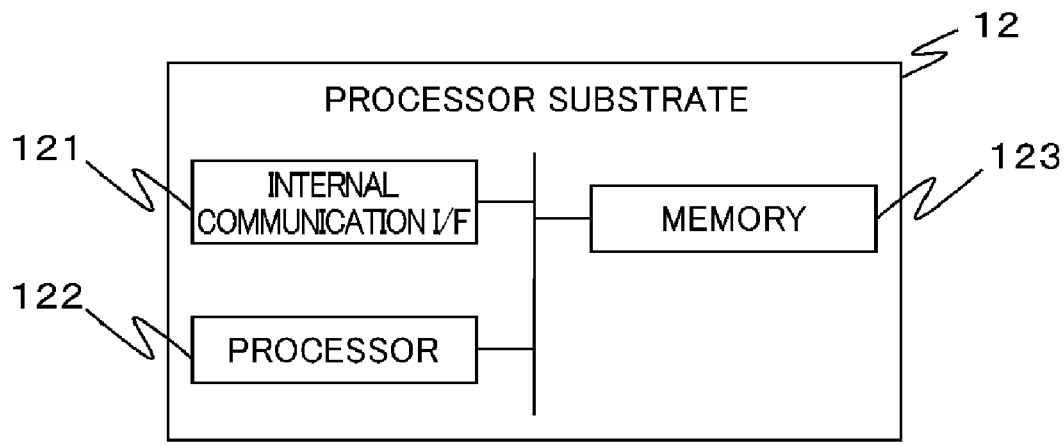
FIG. 5B is an example of a hardware configuration of a processor substrate 12.

FIG. 5B shows a hardware configuration of a processor substrate 12. The processor substrate 12 includes an internal communication interface (hereinafter referred to as internal communication I/F 121), a processor 122, and a memory 123 (local memory) with access performance from the processor 122 (i.e. capable of high-speed access) that is higher than the shared memory 15. The memory 123 stores therein a microprogram. By the processor 122 reading the above-mentioned microprogram from the memory 123 and executing the same, various functions provided by the processor substrate 12 are realized.

The internal communication I/F 121 communicates with the channel substrate 11, the drive substrate 13, the cache memory 14, and the shared memory 15 via the internal switch 16. The processor 122 is configured using a CPU, an MPU, DMA (Direct Memory Access), and the like. The memory 123 is a RAM or a ROM. The processor 122 can access both the memory 123 and the shared memory 15.

Figure 5C:
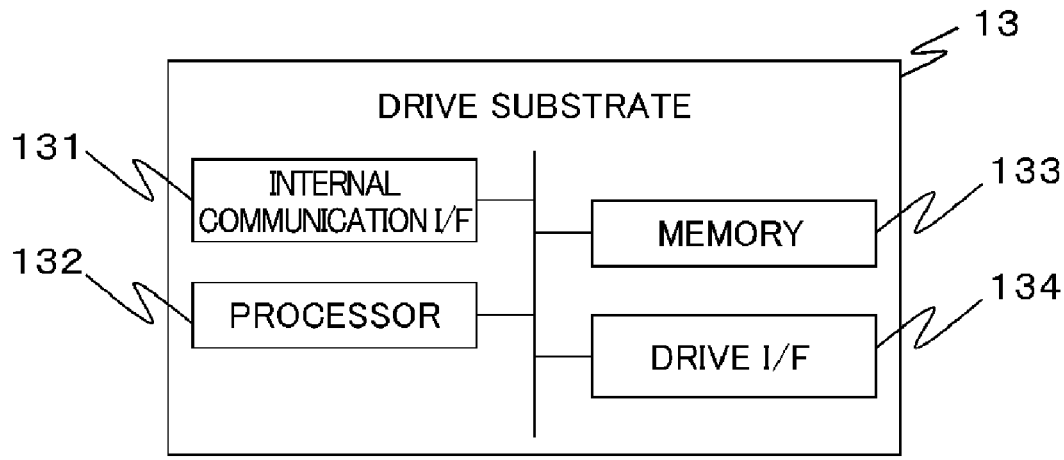
FIG. 5C is an example of a hardware configuration of a drive substrate 13.

FIG. 5C shows a hardware configuration of a drive substrate 13. The drive substrate 13 includes an internal communication interface (hereinafter referred to as an internal communication I/F 131), a processor 132, a memory 133, and a drive interface (hereinafter referred to as a drive I/F 134). The memory 133 stores therein a microprogram. By the processor 132 reading the above-mentioned microprogram from the memory 133 and executing the same, various functions provided by the drive substrate 13 are realized. The internal communication I/F 131 communicates with the channel substrate 11, processor substrate 12, the cache memory 14, and the shared memory 15 via the internal switch 16. The processor 132 is configured using a CPU, an MPU, and the like. The memory 133 is, for example, a RAM or a ROM. The drive I/F 134 communicates with the storage device 17.

The maintenance device 18 shown in FIG. 4 controls and monitors the statuses of the components of the storage system 10. The maintenance device 18 is a personal computer, an office computer, and the like. The maintenance device 18, via the internal switch 16 or communication means such as LAN, communicates as needed with the components of the storage system 10 such as the channel substrate 11, the processor substrate 12, the drive substrate 13, the cache memory 14, the shared memory 15, and internal switch 16, to acquire operation information and the like from the components, and provides them to the management device 4. Furthermore, the maintenance device 18, sets, controls, and maintains the components (including installing and updating software) based on control information and operation information transmitted from the management device 4.

The management device 4 is a computer communicatively coupled to the maintenance device 18 via a LAN and the like. The management device 4 includes a user interface that uses a GUI (Graphic User Interface), CLI (Command Line Interface), and the like to control and monitor the storage system 10.

Figure 5D:
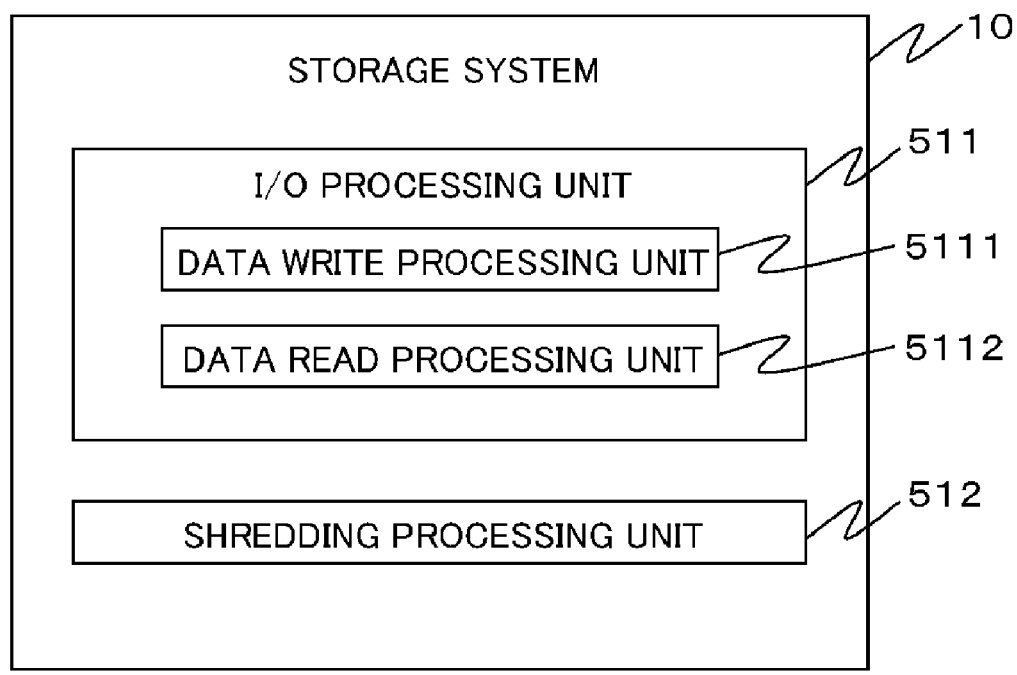
FIG. 5D is a diagram showing the main functions of the storage system 10.

FIG. 5D shows the main functions related to the services provided by the storage system 10 to the server device 3. As shown in FIG. 5D, the storage system 10 includes an I/O processing unit 511 and a shredding processing unit 512. The I/O processing unit 511 includes a data write processing unit 5111 that performs processing related to writing to the storage device 17 and a data read processing unit 5112 that performs processing related to reading of data from the storage device 17. The shredding processing unit 512, in accordance with shredding execution requests transmitted from the server device 3, performs shredding which is described later in units of data blocks.

Note that the functions of the I/O processing unit 511 and the shredding processing unit 512 are realized by the hardware included in the channel substrate 11, the processor substrate 12, and the drive substrate 13 of the storage system 10, or by the processors 112, 122, and 132 reading and executing the microprograms stored in the memories 113, 123, and 133.

Figure 6:
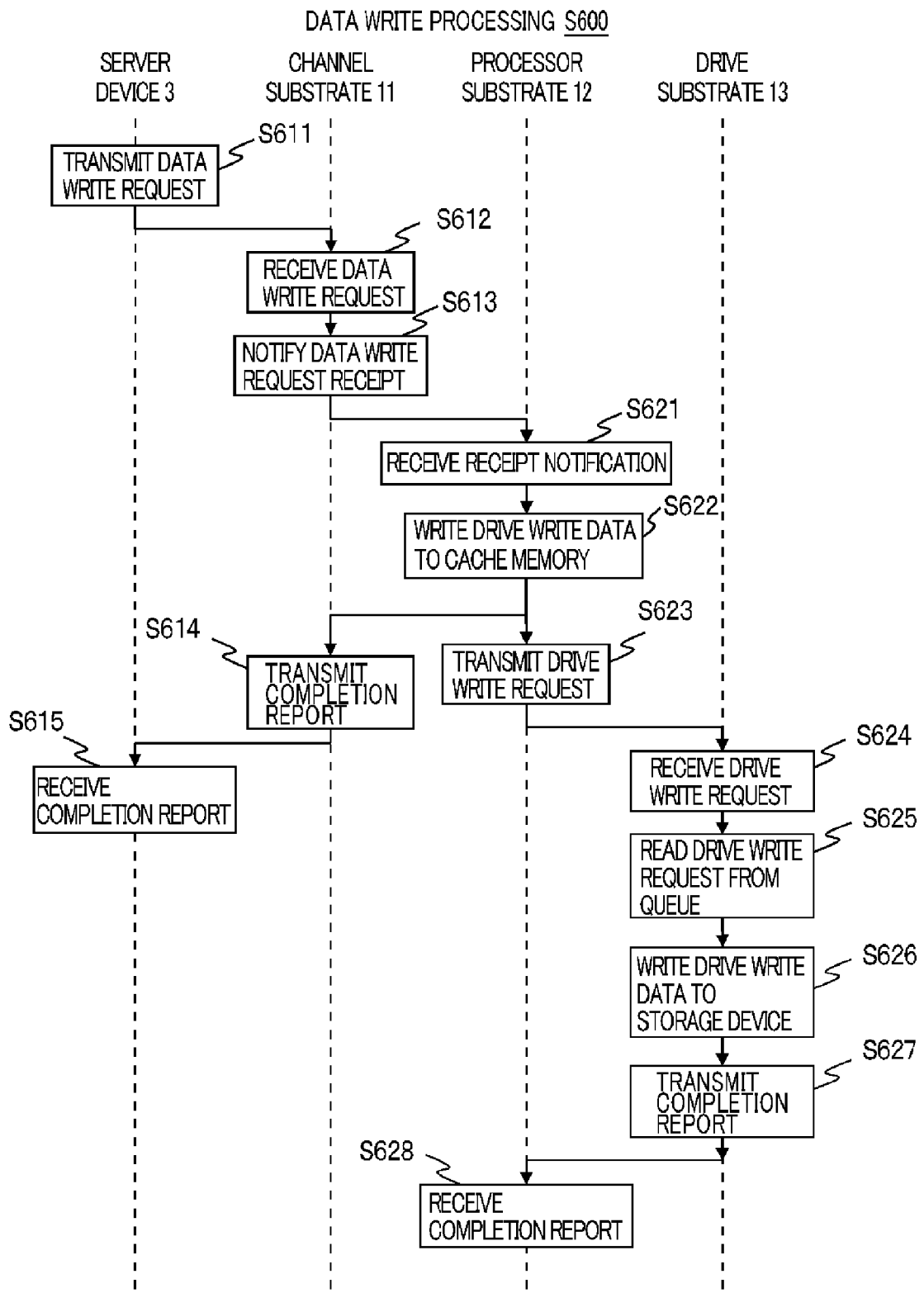
FIG. 6 is a flowchart explaining the data write processing S600.

FIG. 6 is a flowchart explaining the processing performed by the data write processing unit 5111 of the I/O processing unit 511 in a case the storage system 10 receives a frame including a data write request from the server device 3 (hereinafter referred to as the data write processing S600). The data write processing 5600 is described below with reference to FIG. 6. Note that, in the description below, the letter "S" prefixed to each reference numeral indicates "step."

The frame transmitted from the server device 3 is received by the channel substrate 11 in the storage system 10 (S611, S612). The channel substrate 11, when receiving the frame, notifies that to the processor substrate 12 and the drive substrate 13 (S613).

The processor substrate 12, when receiving the above-mentioned notification from the channel substrate 11 (S621), creates a drive write request based on the data write request of the relevant frame, and stores the created drive write request in the cache memory 14. Then, the processor substrate 12 transmits the created drive write request to the drive substrate 13 (S622, S623). The channel substrate 11 transmits the completion report to the server device 3 (S614), and the server device 3 receives the completion report (S615).

The drive substrate 13, when receiving the drive write request, registers the same to the write processing queue (S624). The drive substrate 13 reads the drive write request from the write processing queue as needed (S625). The drive substrate 13 reads the drive write data specified by the read drive write request from the cache memory 14, and writes the read drive write data to the storage drive 171 (S626).

Then the drive substrate 13 notifies the report (completion report) that, for the drive write request, the drive write data has been completed to the processor substrate 12 (S627), and the processor substrate 12 receives the transmitted completion report (S628).

Figure 7:
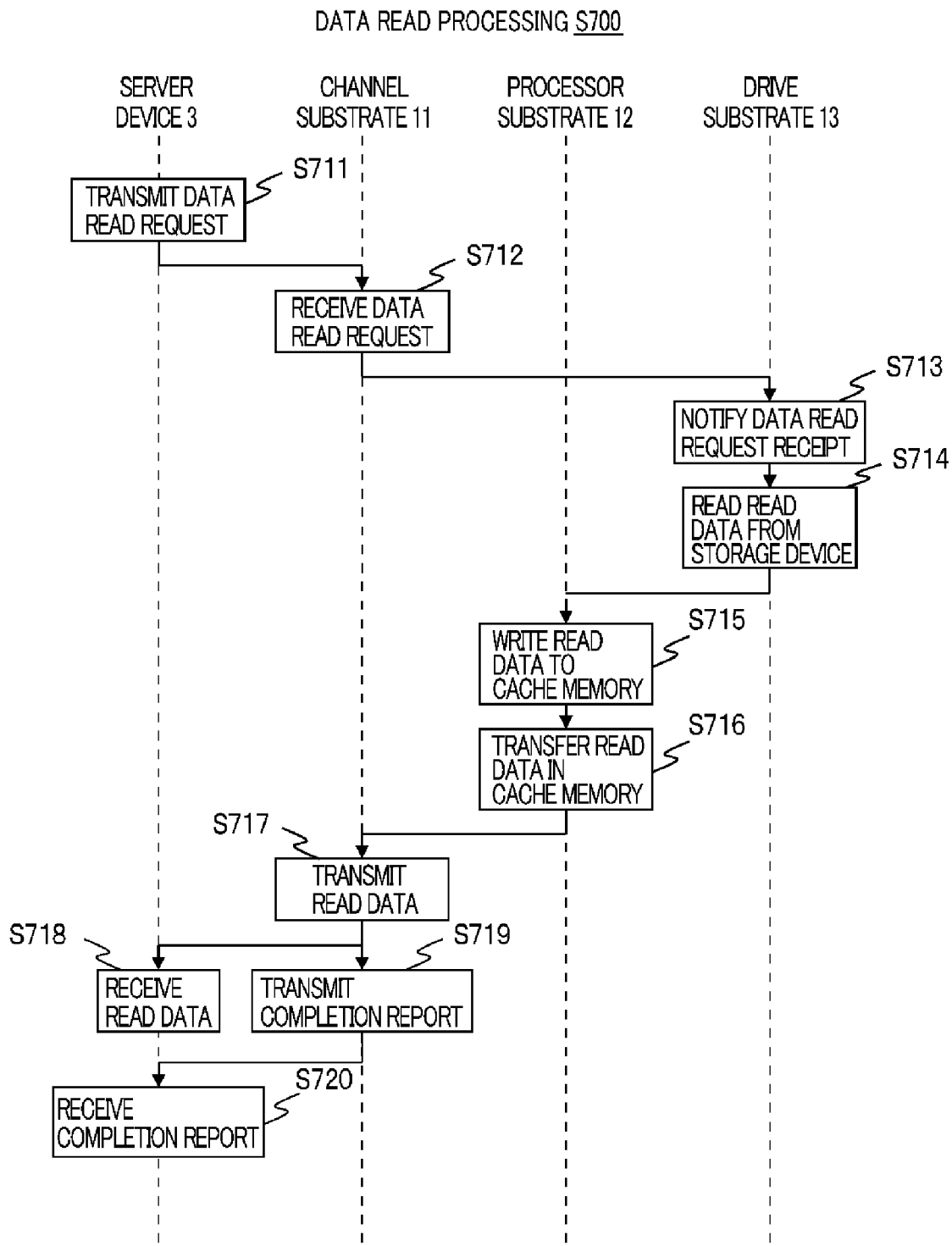
FIG. 7 is a flowchart explaining the data read processing S700.

FIG. 7 is a flowchart explaining the I/O processing performed by the data read processing unit 5112 in the I/O processing unit 511 of the storage system 10 in a case the storage system 10 receives a frame including a data read request from the server device 3 (hereinafter referred to as the data read processing S700). The data read processing S700 is described below with reference to FIG. 7.

The frame transmitted from the server device 3 is received by the channel substrate 11 in the storage system 10 (S711, S712). The channel substrate 11, when receiving the frame from the server device 3, notifies that to the processor substrate 12 and the drive substrate 13 (S713).

The drive substrate 13, when receiving the above-mentioned notification from the channel substrate 11, reads the data specified by the data read request included in the relevant frame (e.g. specified by an LBA (Logical Block Address)) from the storage device 17 (storage drive 171) (S714). Note that, if there is any read data in the cache memory 14 (in a case of a cache hit), the read processing from the storage device 17 (S715) is omitted. The processor substrate 12 writes the data read by the drive substrate 13 to the cache memory 14 (S715). The processor substrate 12 transfers the data written to the cache memory 14 to the communication I/F as needed (S716).

The channel substrate 11 sequentially transmits the read data transmitted from the processor substrate 12 to the server device 3 (S717, S718). When the transmission of the read data is completed, the channel substrate 11 transmits a completion report to the server device 3 (S719), and the server device 3 receives the transmitted completion report (S720).

Next, the main functions of the client device 2, the server device 3, and the storage system 10 will be described.

Figures 8A, 8B:
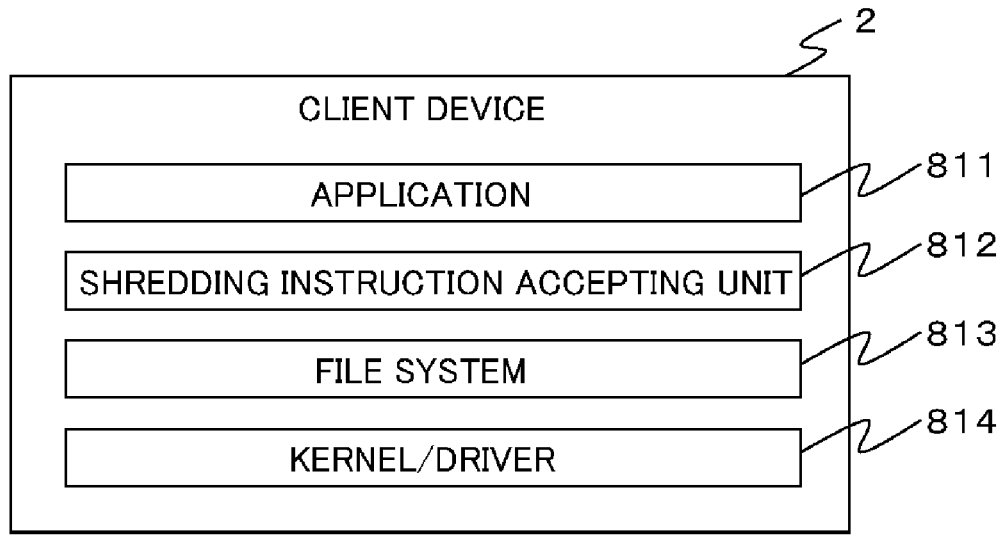
FIG. 8A is a diagram showing the main functions provided by the client device 2.
FIG. 8B is an example of a shredding request instruction screen 850.

FIG. 8A shows the main functions provided by the client device 2. As shown in FIG. 8A, the client device 2 provides functions of various applications 811, a shredding instruction accepting unit 812, a file system 813, and a kernel/driver 814. Note that these functions are realized by the CPU 21 of the client device 2 reading and executing programs stored in the memory 22 and the storage device 23. On the other hand, the file system 813 and the kernel/driver 814 are realized, for example, as the functions of the operating system installed in the client device 2.

In FIG. 8A, the applications 811 are realized, for example, by the application software operating on the above-mentioned operating system. The shredding instruction accepting unit 812 accepts an instruction for shredding in units of files from the user, and transmits the shredding request corresponding with the accepted instruction to the server device 3. Here, shredding indicates the processing of physically writing data consisting of fixed values or random values once or more times to data blocks in the storage drives 171 configuring the storage device 17 in the storage system 10, for physically deleting traces that data had been stored. When the storage drive 171 is a hard disk drive, to completely delete traces of data (remaining magnetism), repeated writing data consisting of fixed values or random values is considered to be necessary.

The above-mentioned shredding request includes at least information such as a file name or a file path name (identifier) (hereinafter referred to as a file path name) and the like for identifying the file to be the shredding target file accepted by the shredding instruction accepting unit 812. FIG. 8B shows an example of the screen displayed when the shredding instruction accepting unit 812 accepts the shredding instruction from a user (hereinafter referred to as a shredding request instruction screen 850).

The file system 813 in FIG. 8A, for the client device 2, realizes I/O functions for the logical volumes (LUs) in units of files or in units of directories. The file system 813 is, for example, FAT (File Allocation Table), NTFS, HFS (Hierarchical File System), ext2 (second extended file system), ext3 (third extended file system), ext4 (fourth extended file system), UDF (Universal Disk Format), HPFS (High Performance File system), JFS (Journaled File System), UFS (Unix File System), VTOC (Volume Table Of Contents), XFS, and the like.

The kernel/driver 814 is realized by executing the kernel module or driver module configuring software of the operating system. Among these, the kernel module, for the software executed in the client device 2, includes programs for realizing fundamental functions included in the operating system such as process management, process scheduling, storage area management, and handling of interruption requests from the hardware. On the other hand, the driver module includes programs for hardware comprising the client device 2 and peripheral devices in connection with the client device 2 to communicate with the kernel module.

Figure 9:
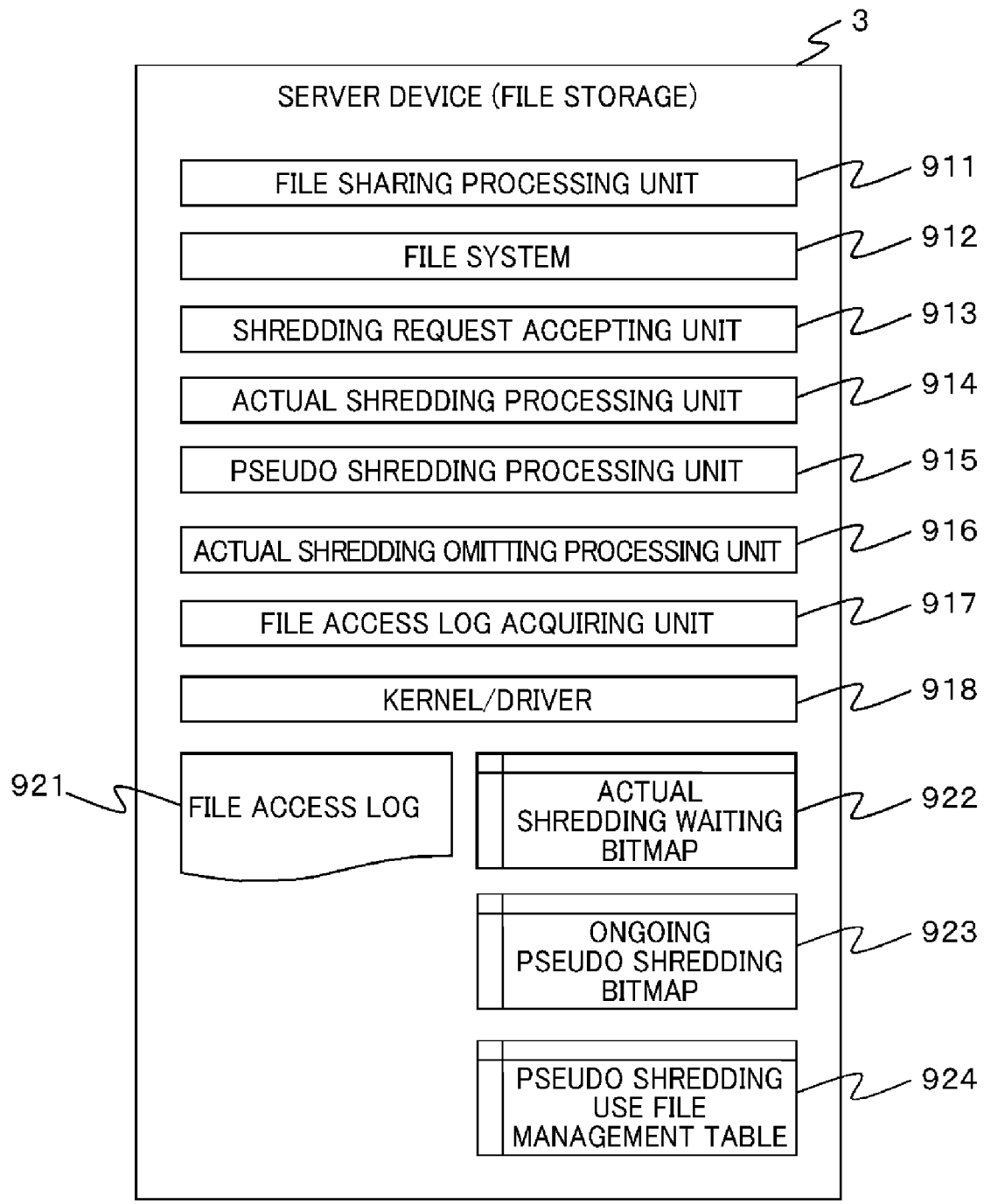
FIG. 9 is a diagram showing the main functions included in the server device 3 and the data (table) managed in the server device 3.

FIG. 9 shows the main functions of the server device 3 and data (table) managed in the server device 3. As shown in FIG. 9, the server device 3 includes functions of a file sharing processing unit 911, a file system 912, a shredding request accepting unit 913, an actual shredding processing unit 914, a pseudo shredding processing unit 915, an actual shredding omitting processing unit 916, a file access log acquiring unit 917, and a kernel/driver 918. Note that the shredding request accepting unit 913, the actual shredding processing unit 914, the pseudo shredding control unit 915, and the actual shredding omitting processing unit 916 may be realized as a function of the file system 912 or as a function independent of the file system 912.

In FIG. 9, the file sharing processing unit 911 provides the environment for file sharing to the client device 2. The file sharing processing unit 911 is realized by using the protocols of such as a network file system (distribution file system), for example, NFS (Network File System), CIFS (Common Internet File System), AFS (Andrew File System), and the like.

The file system 912, using the logical volumes (LUs) provided by the storage system 10, provides I/O functions to logical volumes (LUs) in units of files or in units of directories for the client device 2. The file system 912 is, for example, FAT (File Allocation Table), NTFS, HFS (Hierarchical File System), ext2 (second extended file system), ext3 (third extended file system), ext4 (fourth extended file system), UDF (Universal Disk Format), HPFS (High Performance File system), JFS (Journaled File System), UFS (Unix File System), VTOC (Volume Table Of Contents), XFS, and the like.

The shredding request accepting unit 913 accepts shredding requests transmitted from the client device 2. The shredding request accepting unit 913 registers the accepted shredding requests to the processing queue, not shown, and processes the same sequentially.

The actual shredding processing unit 914 performs processing related to actual shredding described later. The pseudo shredding processing unit 915 performs processing related to pseudo shredding described later. The actual shredding omitting processing unit 916 performs processing related to omitting actual shredding described later.

The file access log acquiring unit 917, when access to a file stored in the logical volume (LU) in the storage system 10 is made (data write, data read and the like), makes the information showing the contents of the access (history) (hereinafter referred to as an access log) correspond to the timestamp acquired from the timer device 37, and stores the information as a file access log 921.

The kernel/driver 918 is realized by executing the kernel module or driver module configuring the software of the operating system. The kernel module, for the software executed in the server device 3, includes programs for realizing the fundamental functions included in an operating system such as process management, process scheduling, storage area management, and handling of interruption requests from the hardware. The driver module includes programs for the hardware configuring the server device 3 and the peripheral devices connected to the server device 3 to communicate with the kernel module.

As shown in FIG. 9, the server device 3 manages data such as the file access logs 921, the actual shredding waiting bitmap 922, the ongoing pseudo shredding bitmap 923, and the pseudo shredding use file management table 924. These data are stored and managed, for example, in the memory 32 or in the storage device 33 of the server device 3.

In the file access log 921, the access log acquired by the file access log acquiring unit 917 is stored. FIG. 10A shows an example of a file access log 921. As shown in FIG. 10A, the file access log 921 has one or more records including the date and time 1011 as the current time (timestamp) at the time of acquiring the access log, the path name 1012 of the file as the access target (file path name), the operation 1013 at which the contents of the access (data write, data read and the like) are set, and the user name 1014 which is the identifier of the user which had made the access.

FIG. 10B shows an example of an actual shredding waiting bitmap 922. As shown in 10B, in the actual shredding waiting bitmap 922, for each of the block addresses 9221 of the logical volumes (LUs) (addresses for identifying data blocks), a flag 9222 showing whether the data block is waiting for actual shredding or not is managed. Note that actual shredding refers to actually performing the above-mentioned shredding processing (writing data consisting of fixed values or random values) for the relevant data block in the storage device 17. When the data block of the relevant block address 9221 is waiting for actual shredding, "1" is set for the actual shredding waiting flag 9222 while "0" is set if not.

FIG. 10C shows an example of the ongoing pseudo shredding bitmap 923. As shown FIG. 10C, in the ongoing pseudo shredding bitmap 923, for each block addresses 9231, a flag 9232 indicating whether the data block of the relevant block address 9231 is currently in process of pseudo shredding or not is managed. Note that pseudo shredding indicates acquiring the same effect (the effect of deleting data traces) as the case of performing actual shredding by migrating frequently updated files to the data block where actual shredding is planned. The details of pseudo shredding are described later.

FIG. 10D shows an example of the pseudo shredding use file management table 924. In the pseudo shredding used file management table 924, information showing whether each file (identified by the file path name 9241) stored in the logical volume (LU) is currently used for pseudo shredding or not (status 9242) ("1" is set if the file is used for pseudo shredding while "0" is set if not) is managed. The details of the pseudo shredding use file management table 924 are described later.

Next, the file management method by the file system 912 is described below.

Figure 11:
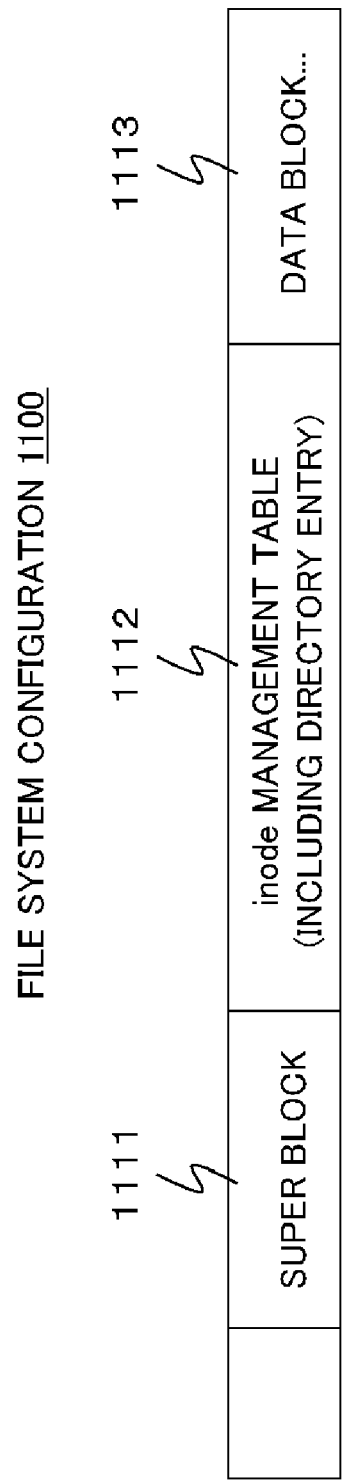
FIG. 11 is an example of a file system structure 1100.

FIG. 11 is an example of the configuration of the data managed by the file system 912 in the logical volume (LU) (hereinafter referred to as a file system structure 1100). As shown in FIG. 11, this file system configuration 1100 includes storage areas of a super block 1111, an inode management table 1112, and a data block 1113 where the entity of the file (data) is stored.

Among these, the super block 1111 stores the information related to a partition set in the logical volume (LU). The super block 1111 is usually set for each disk partition. In the super block 1111, the number of data blocks in the partition, the block size, the number of free blocks, the number of free inodes, the number of times of mounting in the relevant partition, the elapsed time since the latest checking of consistency, and the like are stored.

Management information (hereinafter referred to as an inode) of the files stored in the logical volume (LU) are stored in the inode management table 1112. An inode is set for each file (one inode per file).

Figure 12A:
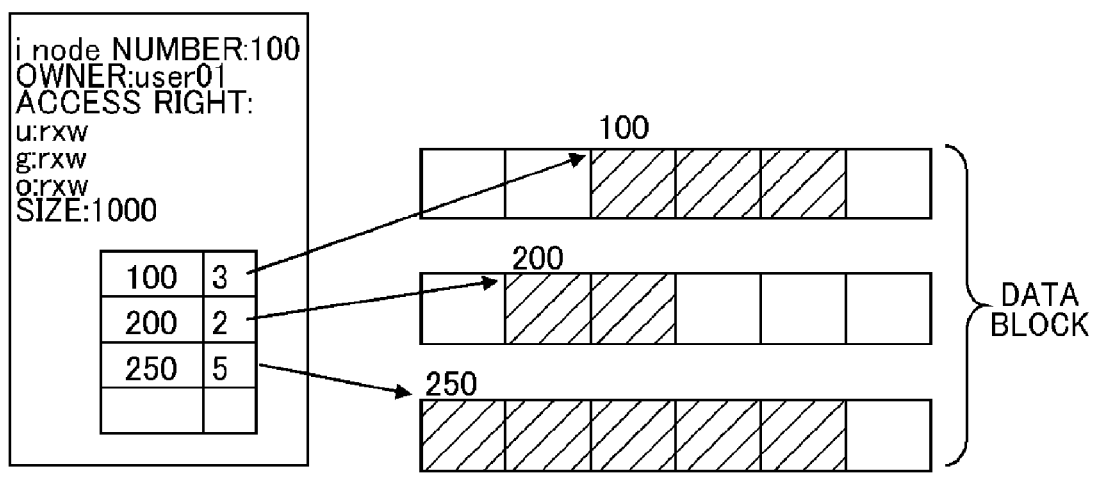
FIG. 12A is a diagram explaining an inode.
Figure 12B:
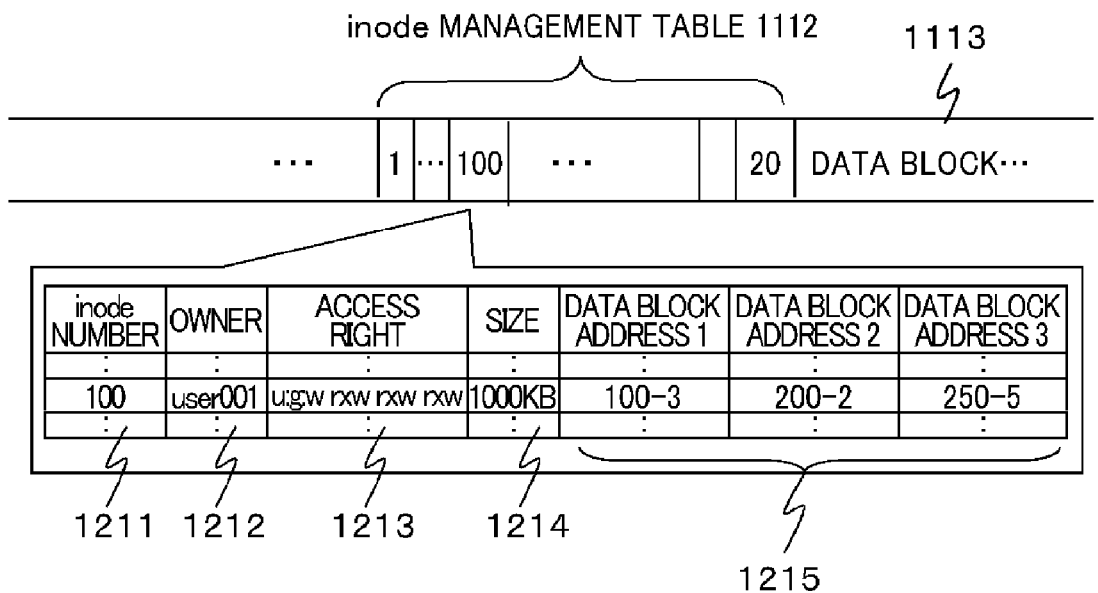
FIG. 12B is a diagram explaining an inode.

FIG. 12A and FIG. 12B show the concept of inodes. As shown in these figures, an inode includes an inode number 1211 which is the identifier for distinguishing each inode, the owner 1212 of the relevant file, the access right 1213 set to the relevant file, the file size 1214 of the relevant file, the information for identifying the data block where the entity of the relevant file (data) is stored (hereinafter referred to as a block address 1215), and the like.

The inode management table 1112 includes a directory entry 1300 (also referred to as a directory file). FIG. 13 shows an example of a directory entry 1300. As shown in the figure, the directory entry 1300 stores the correspondence of file path names 1311 with inode numbers 1312. The file system 912, with reference to the directory entry 1300, identifies the inode numbers 1312 corresponding with the file path names 1311, and conversely identifies the file path names from the inode numbers 1312.

Next, among the functions of the server device 3 shown in FIG. 9, the overview of the processing mainly performed by the shredding request accepting unit 913, the actual shredding processing unit 914, the pseudo shredding processing unit 915, and the actual shredding omitting processing unit 916 is described.

Figure 14:
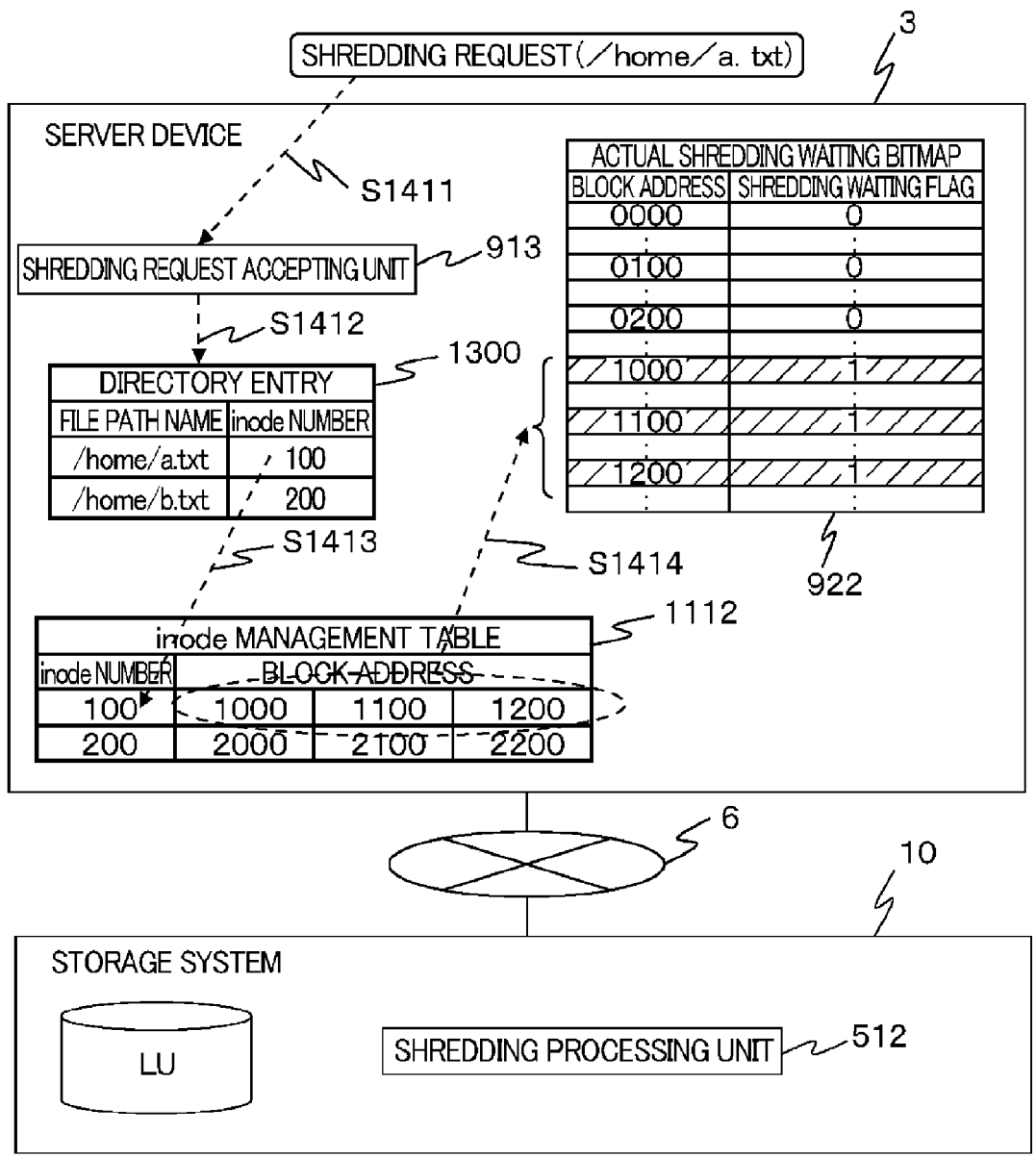
FIG. 14 is a diagram explaining the overview of the shredding request accepting processing S1400.

FIG. 14 is a diagram explaining the overview of the processing performed by the shredding request accepting unit 913 (hereinafter referred to as the shredding request accepting processing S1400).

The shredding request accepting unit 913, when receiving a shredding request transmitted from the client device 2 (S1411), acquires the inode number corresponding with the file path name (the file path name specified as the target of shredding, which is "/home/a.txt" in FIG. 14) included in the received shredding request from the directory entry 1300 (S1412).

Next, the shredding request accepting unit 913 acquires the block address corresponding with the acquired inode number from the inode management table 1112 (S1413). Then, the shredding request accepting unit 913 switches on (0->1) the shredding waiting flag of the acquired block address in the actual shredding waiting bitmap 922 (S1414). By this method, the data block in which the entity of the file specified as the target of shredding is set to the waiting status for actual shredding.

Figure 15A:
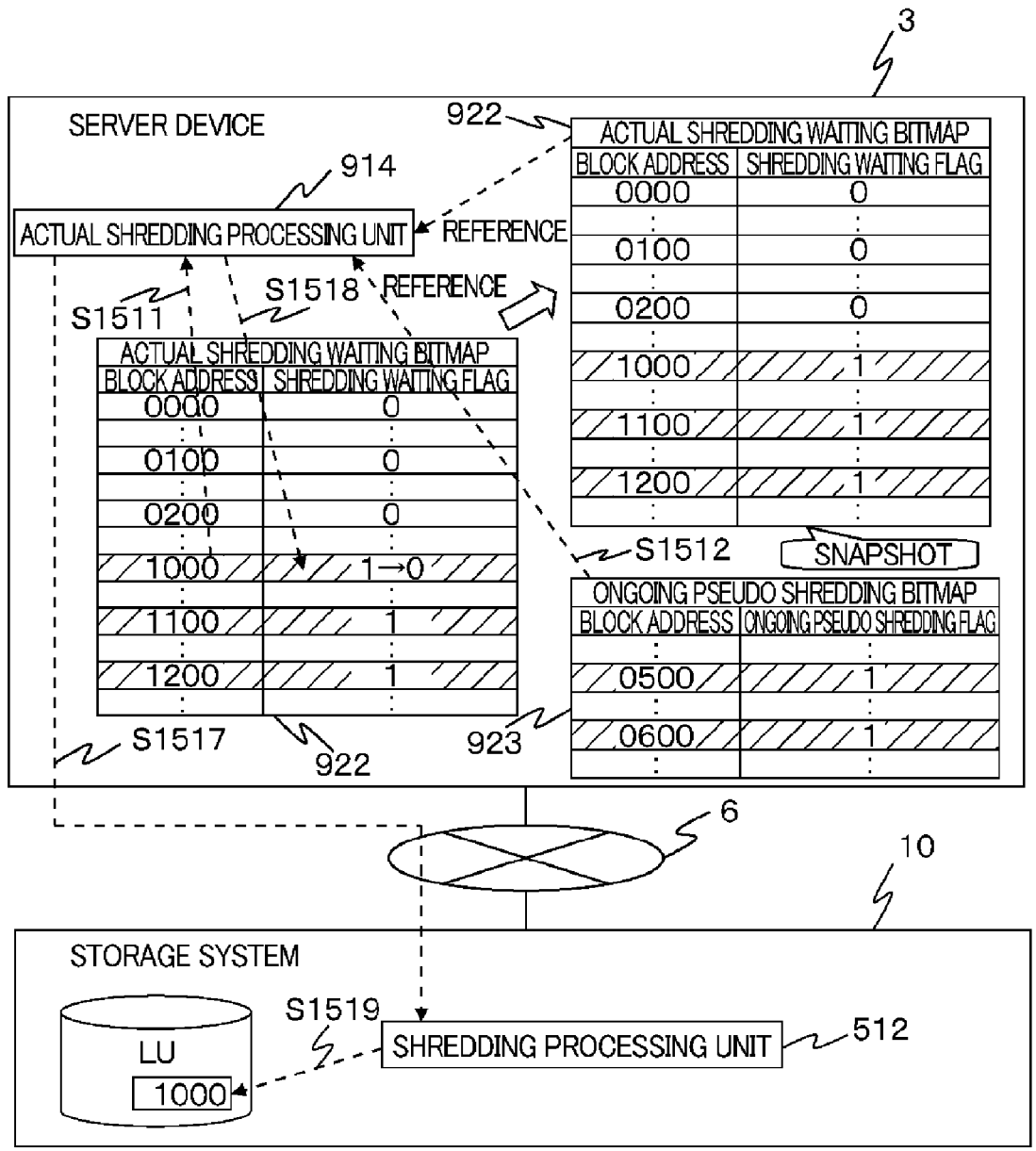
FIG. 15A is a diagram explaining the overview of the actual shredding processing S1500.
Figure 15B:
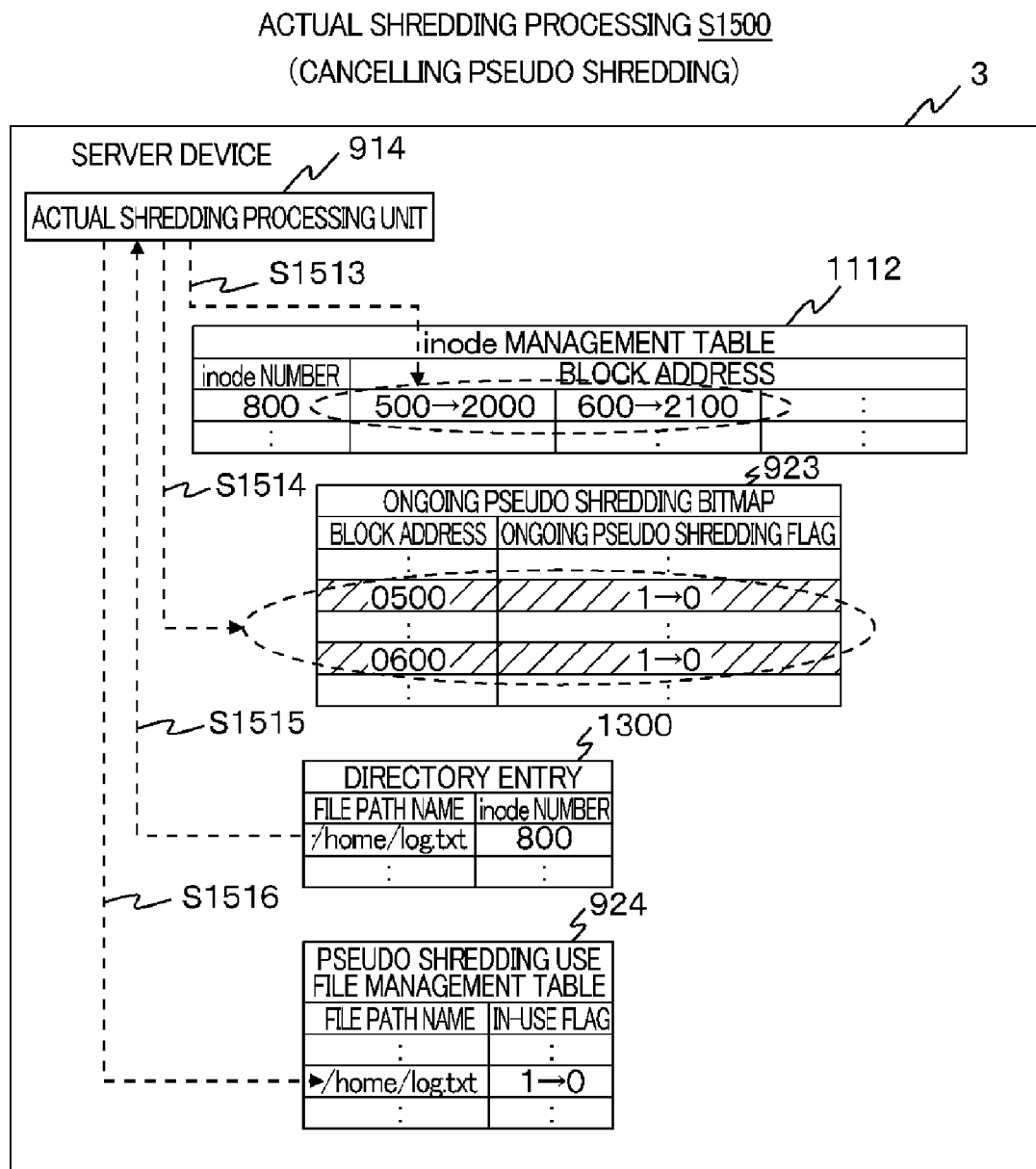
FIG. 15B is a diagram explaining the overview of the actual shredding processing S1500.

FIG. 15A and FIG. 15B are diagrams describing the overview of the processing performed by the actual shredding processing unit 914 (hereinafter referred to as the actual shredding processing S1500). As shown in FIG. 15A, the actual shredding processing unit 914 acquires a snapshot of the actual shredding waiting bitmap 922 and, from the acquired snapshot, acquires the block address 9221 whose shredding waiting flag 9222 is on (the block address of the data block in the waiting status to which no shredding request is not yet transmitted) (S1511).

Next, the actual shredding processing unit 914, with reference to the ongoing pseudo shredding bitmap 923, determines whether the acquired block address is currently in process of pseudo shredding or not (S1512). If pseudo shredding is in process (the ongoing pseudo shredding flag 9232 is on), the actual shredding processing unit 914 migrates (or copies) the data stored in the data block as the shredding target (the data of the file used for pseudo shredding which must not be deleted) to a safe data block which is not a target of shredding currently (e.g. unused data block). Then, as shown in FIG. 15B, the actual shredding processing unit 914 replaces the block address of the data block as the shredding target in the inode management table 1112 with the block address of the data block as the shredding target (S1513). As also shown in FIG. 15B, the actual shredding processing unit 914 turns off (1->0) the value of the ongoing pseudo shredding flag 9232 of the above-mentioned replaced block address in the ongoing pseudo shredding bitmap 923 (S1514). Furthermore, the actual shredding processing unit 914, during the above-mentioned replacement, acquires the file path name corresponding with the inode number for which the block address was replaced from the directory entry 1300 (S1515), and switches the status of the above-mentioned acquired file path name in the pseudo shredding use file management table 924 to unused (1->0) (S1516).

In the determination at S1512 in FIG. 15A, after migrating the data or when the acquired block address is currently not in process of pseudo shredding, the actual shredding processing unit 914 transmits a shredding execution request for the acquired block address to the storage system 10 (S1517). The actual shredding processing unit 914, after transmitting the shredding execution request, turns off (1->0) the shredding waiting flag 9222 in the actual shredding waiting bitmap 922 (S1518). On the other hand, the storage system 10, after receiving the shredding execution request, for the data block as the shredding target, performs data write for shredding (S1519).

Figure 16:
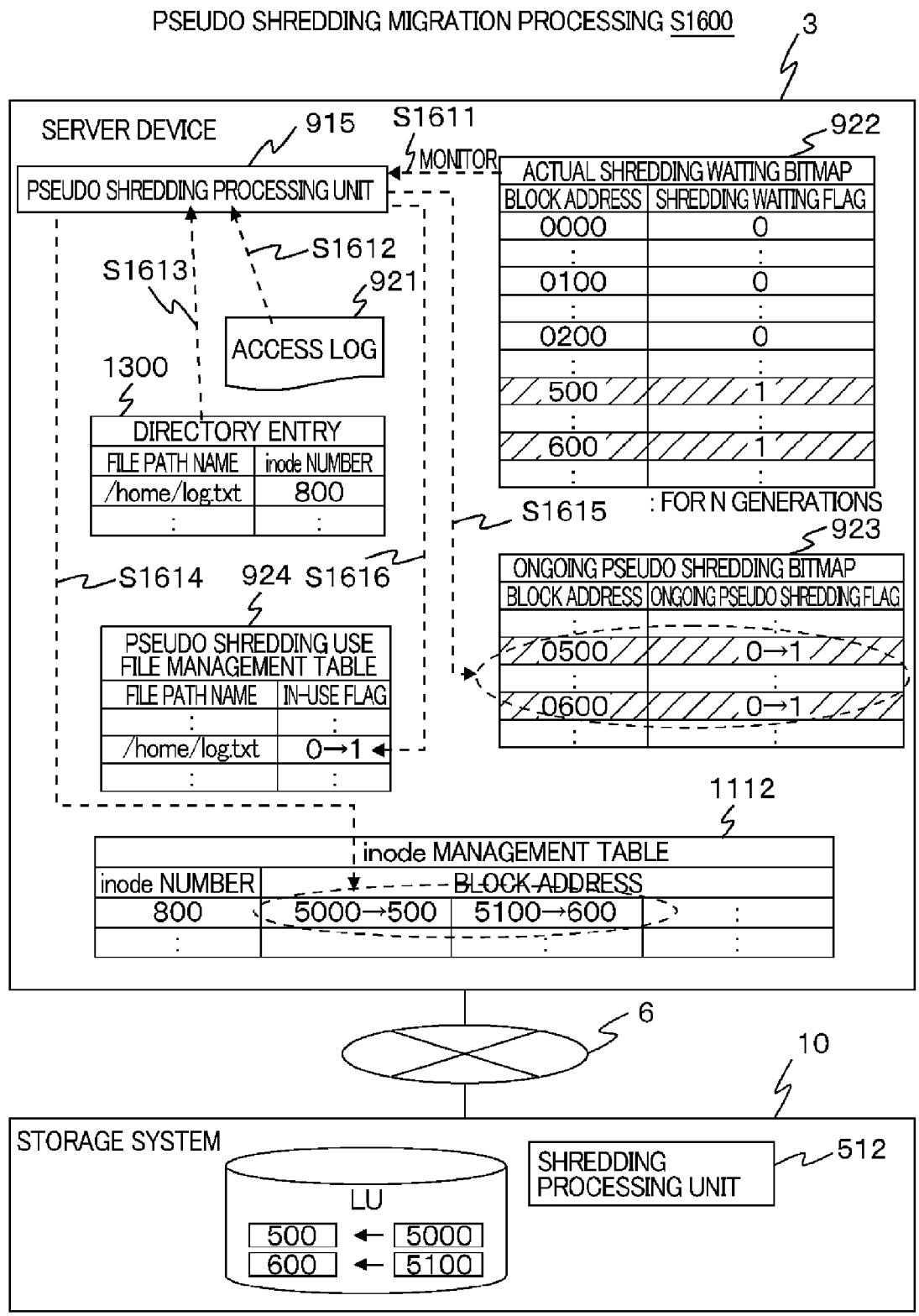
FIG. 16 is a diagram explaining the overview of the pseudo shredding migration processing S1600.

FIG. 16 is a diagram describing the overview of the processing performed by the pseudo shredding processing unit 915 (hereinafter referred to as the pseudo shredding migration processing S1600). The pseudo shredding processing unit 915, when determining that the transmission of shredding execution requests is stagnant, switches the data blocks in the actual shredding waiting status to the pseudo shredding status. Here, the determination on whether the transmission of shredding performing requests is stagnant or not is made based on whether the number of the data blocks in the actual shredding waiting status and the increment of the same has exceeded the threshold or not. For example, the pseudo shredding processing unit 915 determines that the transmission is stagnant when the number of shredding execution requests in the processing queue and the increment of the same has exceed the previously set thresholds.

The above-mentioned migration by the pseudo shredding processing unit 915 is specifically performed in the following way. The pseudo shredding processing unit 915 monitors the actual shredding waiting bitmap 922 as needed, and determines whether the transmission of shredding execution requests by the actual shredding processing unit 914 to the storage system 10 is stagnant or not (S1611). Here, the pseudo shredding processing unit 915, for example, monitors the actual shredding waiting bitmap 922 and n generations of snapshot groups for the same as needed, ascertains the number of data blocks in the waiting status for shredding execution requests in each generation and the chronological change in the number and, when the number of data blocks in the waiting status exceeds a predetermined threshold (first condition) and, at the same time, when the increment per unit of time of data blocks in the waiting status exceeds a predetermined threshold (second condition), determines that the transmission of shredding execution requests is stagnant. Note that both the above-mentioned first and second conditions need not be set and only either of the two being satisfied may be enough to determine that the transmission is stagnant.

Figure 17:
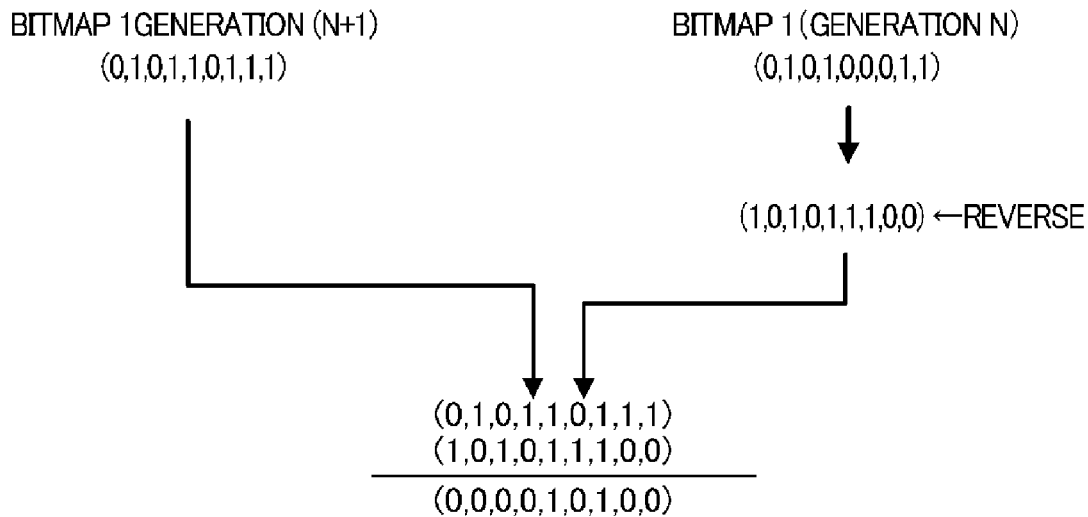
FIG. 17 is a diagram explaining the method of ascertaining the chronological change in the number of data blocks in queue for a shredding execution request.

The above-mentioned chronological change can be acquired by, for example, as shown in FIG. 17, reversing all the bits in the actual shredding waiting bitmap 922 in the generation n, performing a logical operation (AND) for the same and the actual shredding waiting bitmap 922 of the generation n+1, and ascertaining the number of data blocks switched to the shredding waiting status between the generation n and the generation n+1.

The pseudo shredding processing unit 915, when determining that the transmission of shredding execution requests is stagnant, selects a file whose update frequency exceeds a predetermined threshold as the file to be used for pseudo shredding (hereinafter referred to as a pseudo shredding use file) (S1612). The above-mentioned update frequency is ascertained with reference to the file access log 921. For example, the pseudo shredding processing unit 915, as the update frequency, ascertains the number of updates during a unit of time in the predetermined past time with the point of time set as the reference (e.g. the current time) as the starting point.

Next, the pseudo shredding processing unit 915 acquires the inode number of the selected pseudo shredding use file from the directory entry 1300, and identifies the block address made to correspond with the above-mentioned acquired inode number from the inode management table 1112 (S1613). Then, the pseudo shredding processing unit 915 migrates (copies) the data stored in the data block of the above-mentioned identified block address to the data block whose actual shredding waiting flag 9222 is turned to on in the actual shredding waiting bitmap 922, and replaces the value of the above-mentioned inode number in the inode management table 1112 with the value after migration (copying) (S1614). Furthermore, the pseudo shredding processing unit 915, for the data block as the target of migration to pseudo shredding, turns on (0->1) the ongoing pseudo shredding flag in the ongoing pseudo shredding bitmap 923 (S1615). Furthermore, the pseudo shredding processing unit 915 turns on (0->1) the in-use flag 9242 of the pseudo shredding use file in the pseudo shredding use file management table 924 (S1616).

In the following, the above-mentioned shredding request accepting processing S1400, the actual shredding processing S1500, and the pseudo shredding migration processing S1600 are described in detail with reference to the flowcharts.

Figure 18:
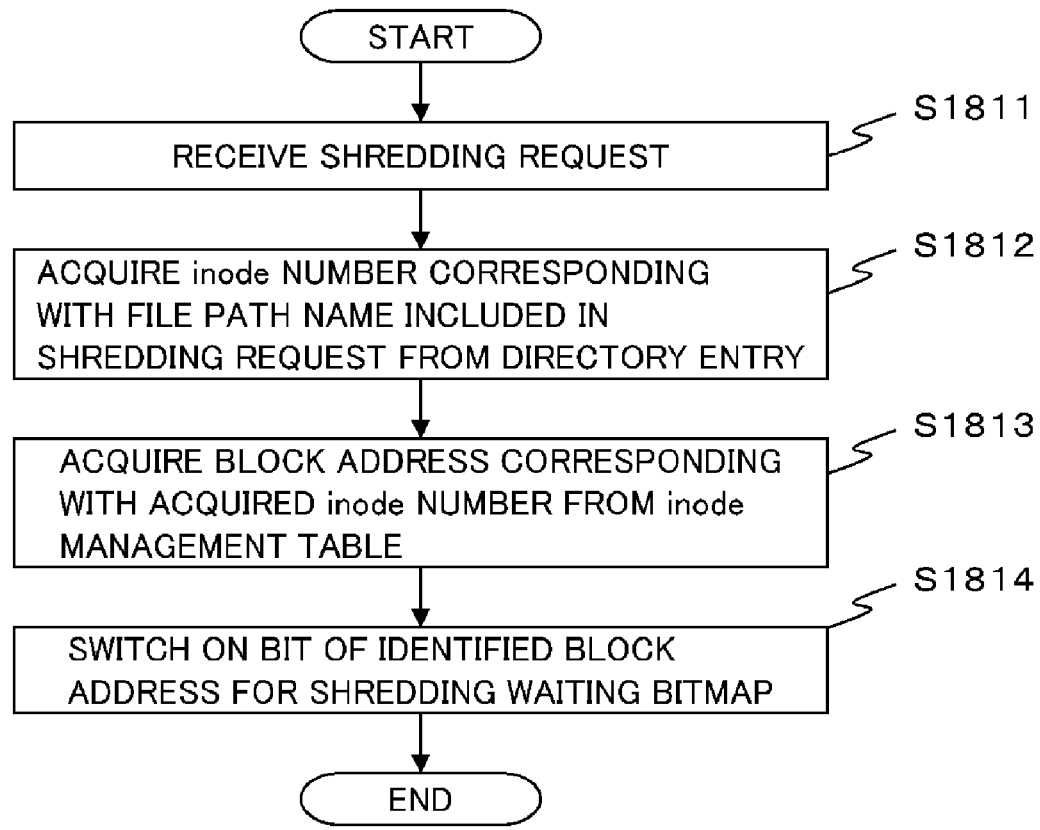
FIG. 18 is a flowchart explaining the details of the shredding request accepting processing S1400.

FIG. 18 is a flowchart describing the details of the shredding request accepting processing S1400 which has been explained with reference to FIG. 14.

As shown in FIG. 14, the shredding request accepting unit 913, when receiving a shredding request from the client device 2 (S1811), searches the directory entry 1300 and acquires an inode number corresponding with the file path name included in the received shredding request (S1812).

Next, the shredding request accepting unit 913 acquires the block address corresponding with the acquired inode number from the inode management table 1112 (S1813), and turns on (0->1) the shredding waiting flag of the acquired block address in the actual shredding waiting bitmap 922 (S1814).

Figure 19:
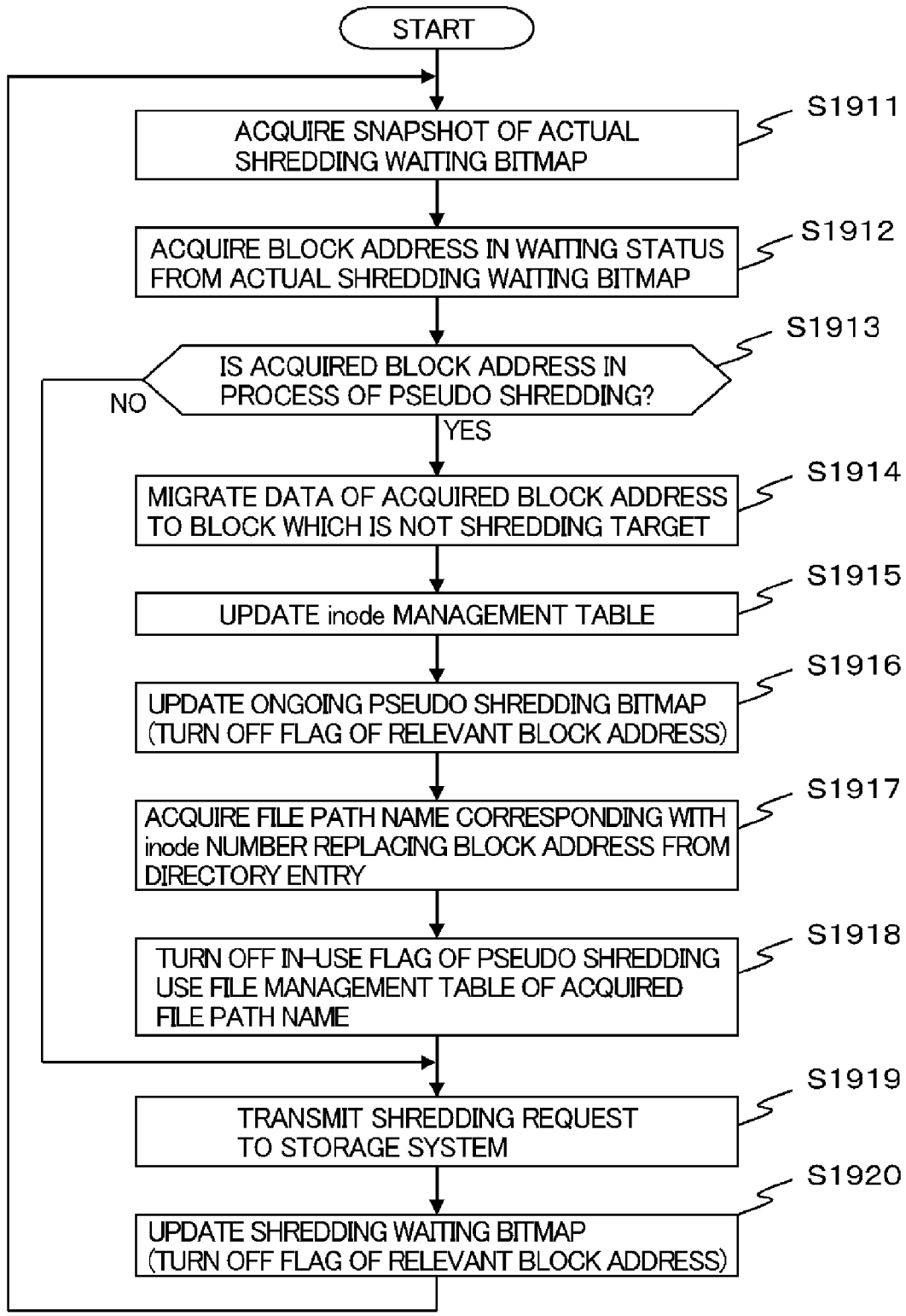
FIG. 19 is a flowchart explaining the details of the actual shredding processing S1500.

FIG. 19 is a flowchart explaining the details of the actual shredding processing S1500 which has been explained with reference to FIG. 15A and FIG. 15B.

First, the actual shredding processing unit 914 acquires a snapshot of the actual shredding waiting bitmap 922 (S1911) and, from the acquired snapshot, acquires the block address 9221 whose actual shredding waiting flag 9222 is turned on (the block address of the data block in the waiting status from which a shredding performing request has not yet been transmitted to the storage system 10) (S1912).

Next, the actual shredding processing unit 914, with reference to the ongoing pseudo shredding bitmap 923, determines whether the in process of pseudo shredding flag 9232 corresponding with the above-mentioned acquired block address is currently on (in process of pseudo shredding) or not (S1913). If the in process of pseudo shredding flag 9232 is turned on (S1913: YES), the processing proceeds to S1914 and, if the flag is turned off (S1913: NO), proceeds to S1919.

At S1914, the actual shredding processing unit 914 migrates (or may copy) the data stored in the data block with the block address acquired at S1912 to a safe data block which is currently not a target of shredding. Furthermore, the actual shredding processing unit 914 replaces the block address of the data block as the shredding target in the inode management table 1112 with the block address of the data block as the shredding target (S1915).

As mentioned above, when actual shredding is performed, it is determined whether the target data block is in process of pseudo shredding or not and, if the data block is in process of pseudo shredding, the entity of the target data block (entity of pseudo shredding used file) is saved to an unused area and the like, which allows a safe management of pseudo shredding use files.

Next, the actual shredding processing unit 914 turns off (1->0) the ongoing pseudo shredding flag 9232 of the above-mentioned replaced block address in the ongoing pseudo shredding bitmap 923 (S1916). Furthermore, the actual shredding processing unit 914 acquires the file path name corresponding with the inode number for the replaced block address from the directory entry 1300 (S1917), and switches the status of the above-mentioned acquired file path name in the pseudo shredding use file management table 924 to unused (1->0) (S1918).

At S1919, the actual shredding processing unit 914 transmits a shredding execution request to the storage system 10. At S1920, the actual shredding processing unit 914 turns off (1->0) the actual shredding waiting flag 9222 in the actual shredding waiting bitmap 922 (S1920).

Figure 20:
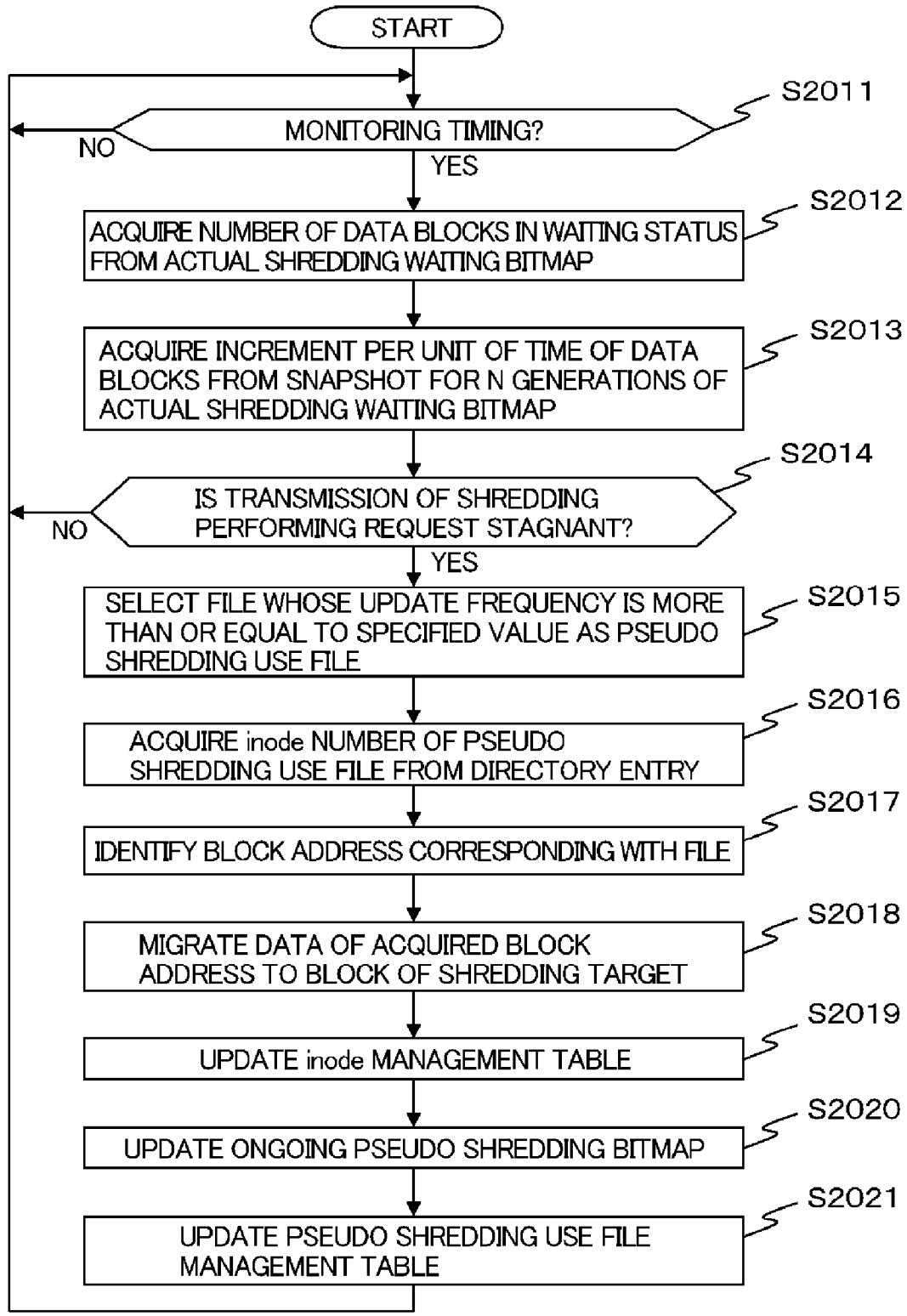
FIG. 20 is a flowchart explaining the details of the pseudo shredding migration processing S1600.

FIG. 20 is a flowchart explaining the details of the pseudo shredding migration processing S1600 which has been explained with reference to FIG. 16.

The pseudo shredding processing unit 915 monitors the actual shredding waiting bitmap 922 as needed, and determines whether the transmission of shredding execution requests is stagnant or not (S2011). If the monitoring time comes (S2011: YES), the pseudo shredding processing unit 915, from the current actual shredding waiting bitmap 922, acquires the number of data blocks in the waiting status for shredding execution requests (the number of data blocks whose shredding waiting flags are turned on) (S2012). Furthermore, the pseudo shredding processing unit 915, from the snapshots of n generations of actual shredding waiting bitmaps 922, acquires the increment of data blocks in units of time (S2013). Note that the pseudo shredding processing unit 915 acquires the snapshots of the actual shredding waiting bitmaps 922 as needed, and retains and manages the acquired n generations of snapshots in the memory 32 and in the storage device 33.

Next, the pseudo shredding processing unit 915, by comparing the number of the acquired data blocks in a waiting status and/or the increment (or either one of those) with the previously set threshold(s), determines whether the transmission of shredding execution requests by the actual shredding processing unit 914 to the storage system 10 is stagnant or not (S2014). If the transmission is determined to be stagnant (S2013:YES), the processing proceeds to S2015, and if determined not to be stagnant, returns to S2011.

At S2015, the pseudo shredding processing unit 915 selects the file whose update frequency exceeds a predetermined threshold as the pseudo shredding use file. Note that, as mentioned above, the update frequency is ascertained with reference to the file access log 921.

Next, the pseudo shredding processing unit 915 acquires the inode number of the selected pseudo shredding used file from the directory entry 1300 (S2016) and, from the inode management table 1112, identifies the block address made to correspond with the above-mentioned acquired inode number (S2017).

Next, the pseudo shredding processing unit 915 migrates (or may copy) the data stored in the data block with the specified block address to a data block whose actual shredding waiting flag 9222 is turned on in the actual shredding waiting bitmap 922 (S2018), and replaces the value of the above-mentioned inode number in the inode management table 1112 with the value after migration (or copy) (S2019).

Next, the pseudo shredding processing unit 915, for the data block as a target of being migrated to pseudo shredding, turns on the ongoing pseudo shredding flag 9232 in the ongoing pseudo shredding bitmap 923 (S2020). Furthermore, the pseudo shredding processing unit 915, in the pseudo shredding use file management table 924, turns on the in-use flag of the pseudo shredding use file (S2021). Then, the processing returns to S2011.

Note that, in the pseudo shredding migration processing S1600 shown in FIG. 20, normally, files whose update frequency is high and for which shredding is not necessary (files of little importance in terms of security) are selected as the above-mentioned pseudo shredding used files, however, in a case it is desired that pseudo shredding used files should also be a target of shredding (files requiring shredding should be used as pseudo shredding use files) or in a case there are other needs, for example, by partially altering the pseudo shredding migration processing S1600 shown in FIG. 20, the above-mentioned needs can be met easily.

Figure 21:
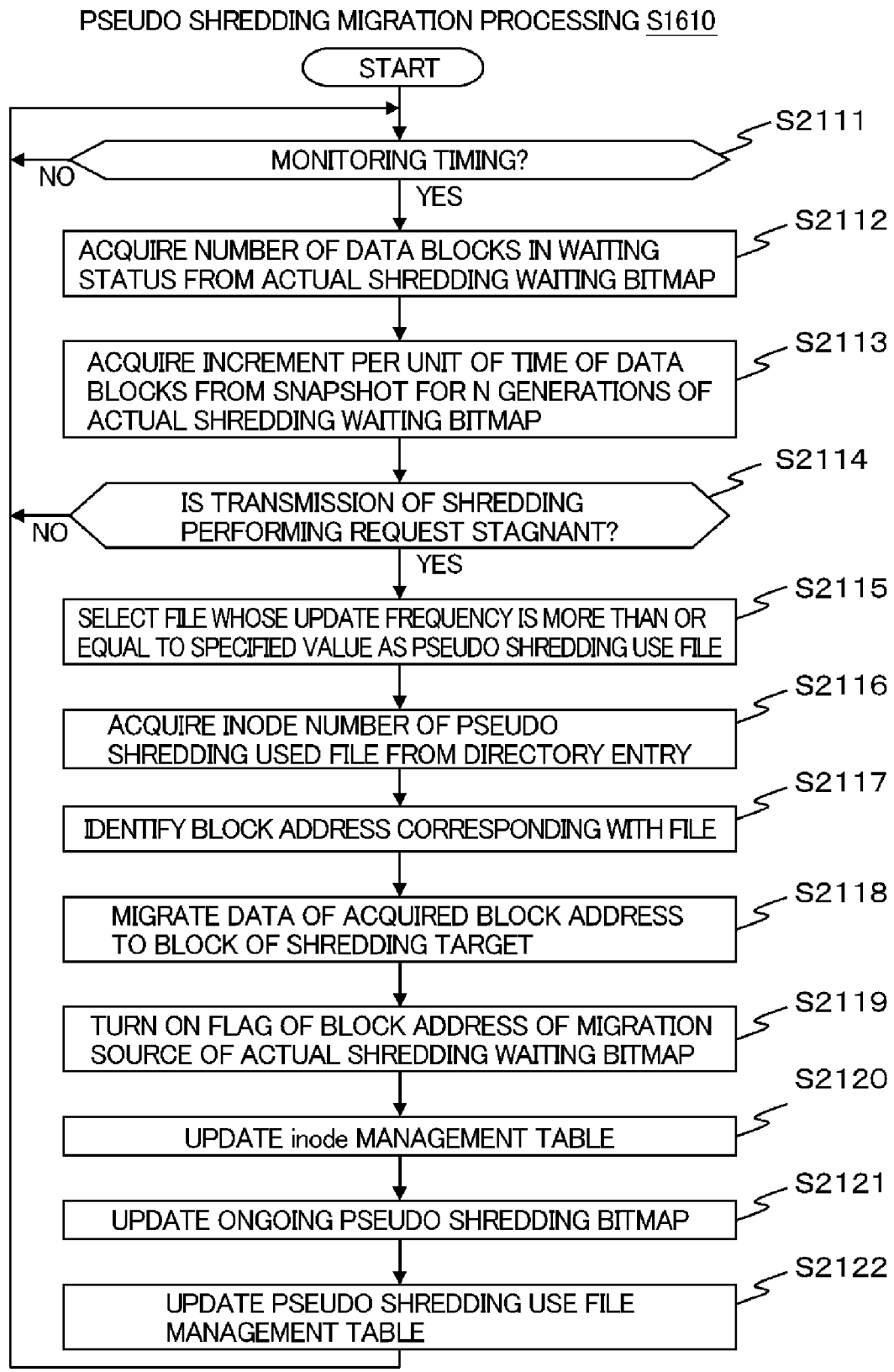
FIG. 21 is a flowchart explaining the details of the pseudo shredding migration processing S1600 (in a case where pseudo shredding use file is the target of shredding).

FIG. 21 is the processing partially altered from the processing in FIG. 20 for making a pseudo shredding used file a target of shredding. As shown in FIG. 21, in this processing, between steps S2018 and S2019 in FIG. 20, the processing of turning on the flag of the block address of the migration source in the actual shredding waiting bitmap 922 (the block address where the data of the pseudo shredding use file is stored) (S2119) is added. By this method, the pseudo shredding use file can also be made a target of shredding.

By the way, as for a data block which is the target of shredding, when the number of updates of the pseudo shredding exceeds a specified number or in similar cases, it can be considered that shredding is substantially completed for the data block. Therefore, this type of data block may be excluded from the target of shredding (by turning off the actual shredding waiting flag 9222). By this method, the target of actual shredding decreases, which helps reduce the load on the server device 3 and the storage system 10. Furthermore, the time required for shredding is shortened, which can shorten the time from when a shredding request is transmitted from the client device 2 until a shredding completion report is notified (turnaround time).

Figure 22:
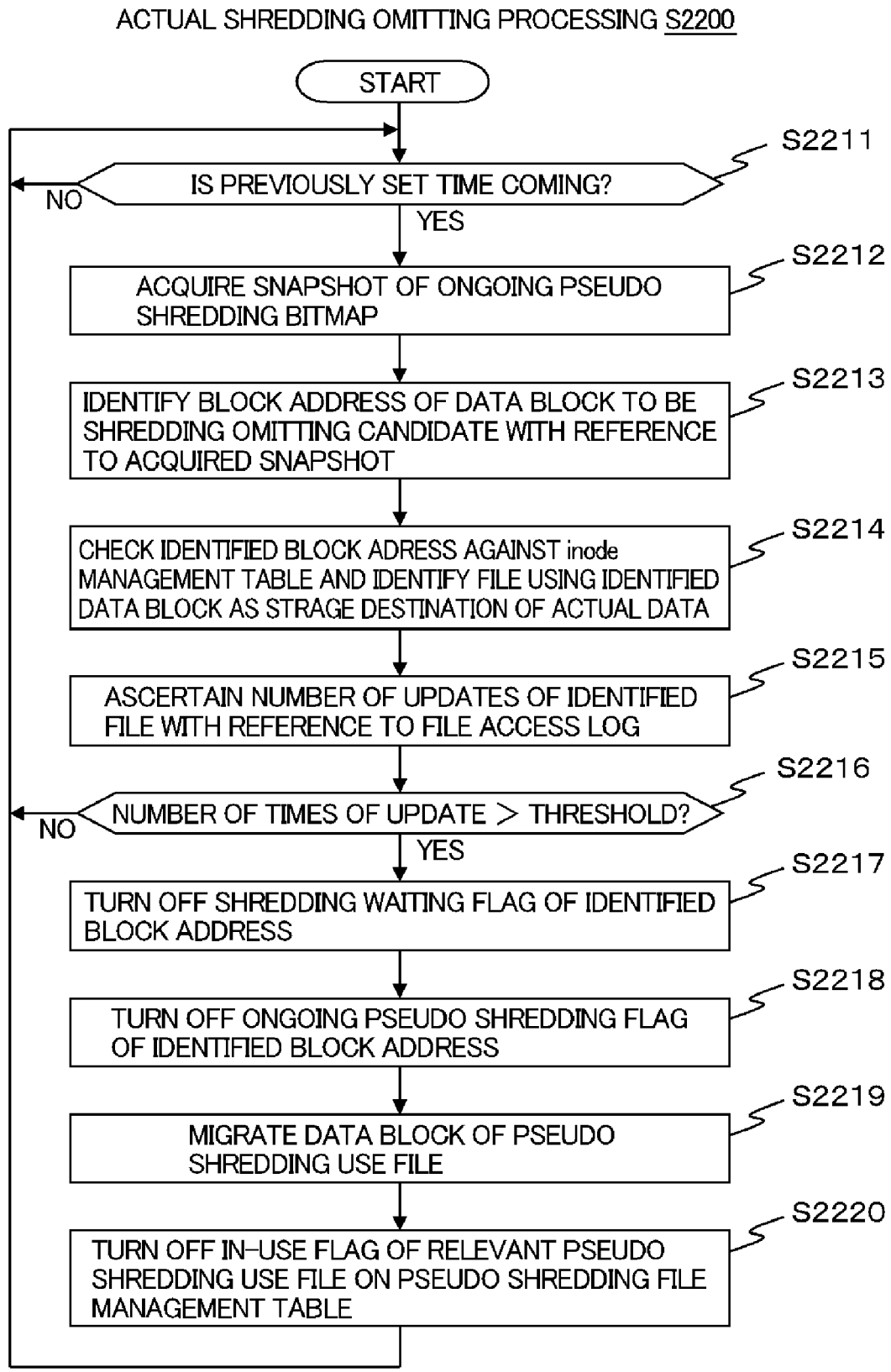
FIG. 22 is a flowchart explaining the actual shredding omitting processing S2200.

FIG. 22 is a flowchart describing the processing performed by the actual shredding omitting processing unit 916 relating to omitting shredding (hereinafter referred to as the actual shredding omitting processing S2200).

The actual shredding omitting processing unit 916, when a previously set time (for example, per a specified interval of time) comes (S2211: YES), acquires the snapshot of the ongoing pseudo shredding bitmap 923, adds the date and time of acquisition (timestamp) to the acquired snapshot, and stores the same in the memory 32 or the storage device 33 (S2212). Note that the processing from S2211 to S2212 is not necessarily required to be performed as a part of the actual shredding omitting processing S2200, and may be performed as a processing independent of the actual shredding omitting processing S2200.

Figure 23:
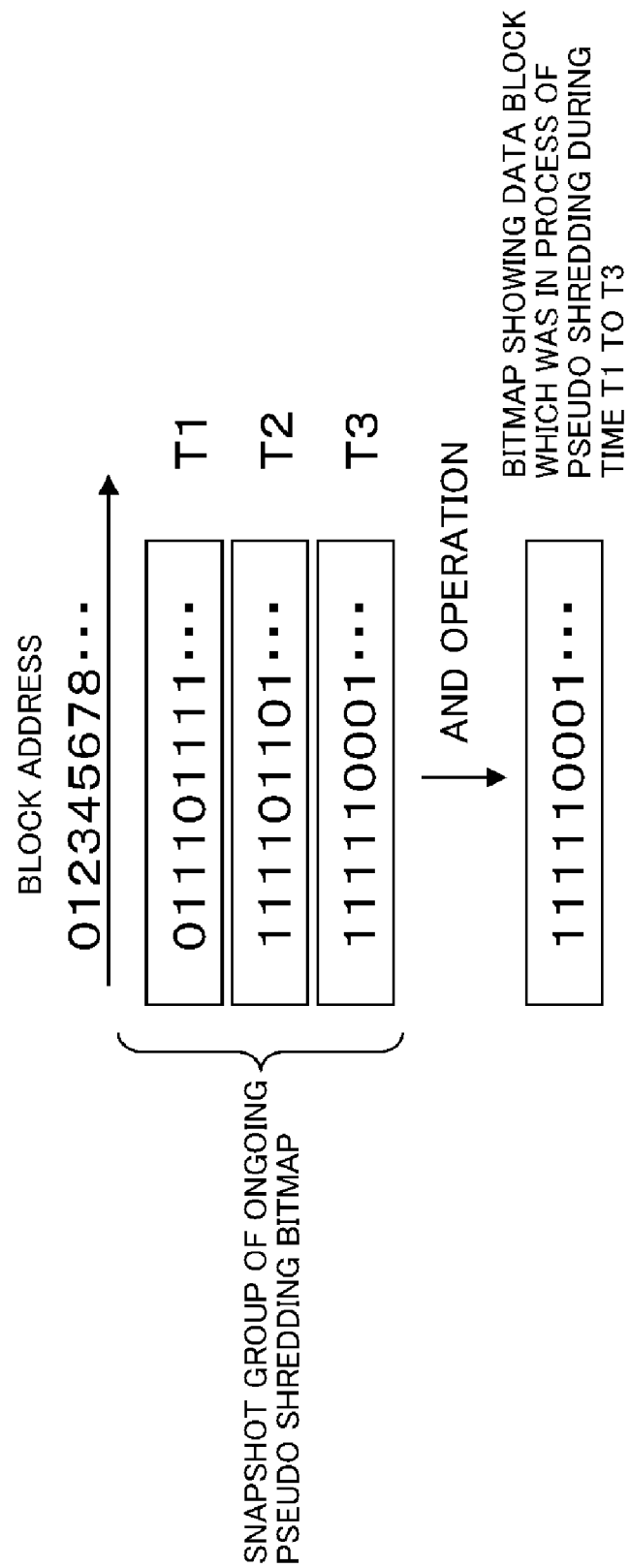
FIG. 23 is a diagram explaining the method of identifying the data block as a candidate of shredding omitting.

Next, the actual shredding omitting processing unit 916, based on reference to the snapshots acquired so far, identifies the data block to be a candidate target of the shredding omitting (identifies the block address) (S2213). This identification is performed by, for example, as shown in FIG. 23, performing an AND operation per block address for the acquired snapshots and ascertaining the block address for which pseudo shredding is continued exceeding the previously set time.

Figure 24:
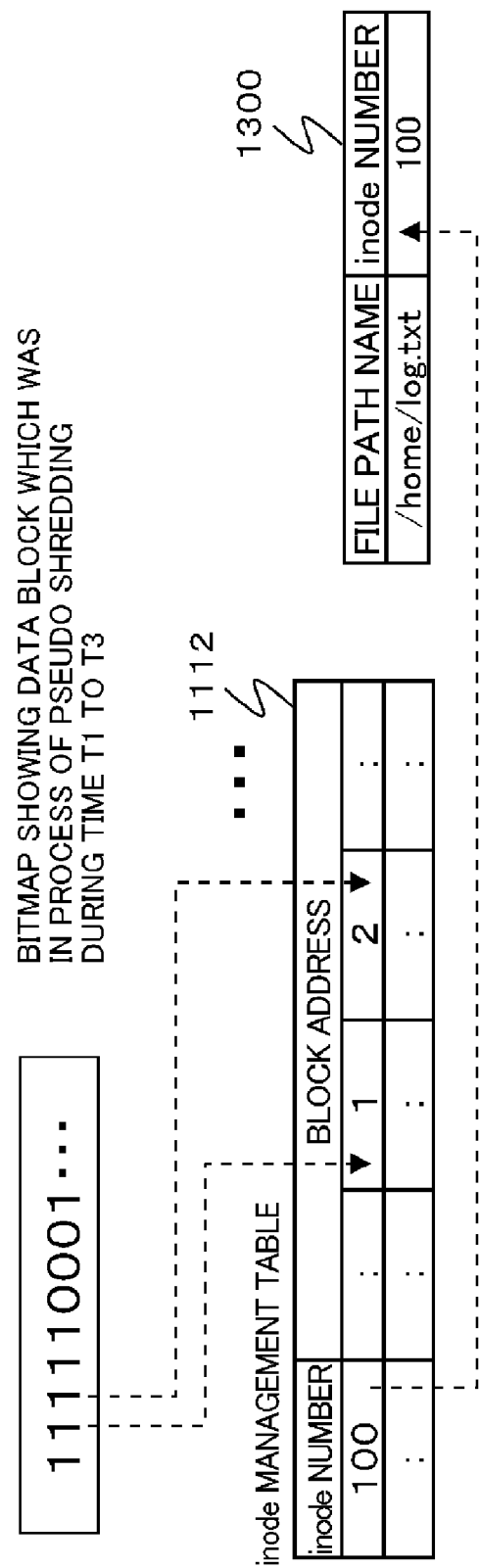
FIG. 24 is a diagram explaining the process of checking the block address of the identified data block with the inode management table 1112.

Next, the actual shredding omitting processing unit 916 checks the block address of the identified data block with the inode management table 1112 (refer to FIG. 24), and identifies the file using the above-mentioned identified data block as the storage destination of the actual data (S2214). Note that, as for the above-mentioned checking, by referring to the pseudo shredding use file management table 924 and focusing on the pseudo shredding use file to compare with the inode management table 1112, the efficiency of the checking can be improved.

Next, the actual shredding omitting processing unit 916, with reference to the file access log 921, ascertains the update frequency of the identified file and ascertains the number of updates from the ascertained update frequency (S2215).

For example, when the file access log 921 has contents shown in FIG. 25, the update frequency of a file with the file path name "/home/log.txt" can be ascertained as 5 times per 2 hours, which equals 2.5 times per hour. Therefore, if the ascertained update frequency is multiplied by the length of time of performing pseudo shredding (T3-T1 in case of FIG. 23), the number of updates can be ascertained. Note that the number of updates may also be permitted to be ascertained by checking the time pseudo shredding has been performed with the contents of the file access log 921.

Next, the actual shredding omitting processing unit 916 determines whether the ascertained number of updates exceeds the previously set threshold (the value for determining whether to omit actual shredding or not) or not (S2216). If the number of updates exceeds the threshold (S2216: YES), the processing proceeds to S2217. If not (S2216: NO), the processing returns to S2211.

At S2217, the actual shredding omitting processing unit 916 turns off (1->0) the actual shredding waiting flag 9222 of the identified block address in the actual shredding waiting bitmap 922.

Next, the actual shredding omitting processing unit 916 turns off (1->0) the ongoing pseudo shredding flag 9232 of the identified block address in the ongoing pseudo shredding bitmap 923 (S2218).

At S2219, the actual shredding omitting processing unit 916, by changing the inode management table 1112, migrates the storage destination of the actual data in the pseudo shredding use file used for pseudo shredding of the above-mentioned identified data block from the current data block (above-mentioned identified data block) to another data block which is not the target of shredding (e.g. an unused block).

At S2220, the actual shredding omitting processing unit 916 turns off (1->0) the in-use flag 9242 of the above-mentioned pseudo shredding use file in the pseudo shredding use file management table 924.

As mentioned above, when pseudo shredding is continuously performed for a certain period of time, shredding can be performed efficiently by omitting shredding. Therefore, this helps shorten the time required for shredding, reduce the load on the server device 3 or the storage system 10, shorten the time (turnaround time) from a shredding request is transmitted from the client device 2 to the shredding completion report is notified, and the like.

Although the present embodiments have been described as above, the above-described embodiments are for the purpose of facilitating the understanding of the present invention and are not for construing the present invention in a limited manner. The present invention may be changed or altered without departing from the spirit thereof and the present invention includes equivalents thereof.

The invention claimed is:

1. An information processing system that receives a data Input/Output (I/O) request in units of files, and performs writing or reading of data to/from a storage system that includes a non-transitory computer readable storage medium storing therein a file entity specified as the data I/O request received in units of data blocks, the information processing system comprising:

a processing part, during shredding of a specific data block of the non-transitory computer readable storage medium, selecting a file whose update frequency exceeds a preset threshold value from files stored in the non-transitory computer readable storage medium, and performing pseudo shredding on the data block by storing a selected file entity in the data block;

a processing part receiving a request to implement shredding in units of files and writes data for shredding on the data block storing a file entity specified by the implementation request received, and starting the pseudo shredding on the data block that is a target of the data write request in a processing wait status when detecting that a number of the shredding implementation request in queue or an increase thereof exceeds a preset threshold value;

a processing part storing a directory entry wherein correspondence between a file path name and an inode number is managed, and an inode management table wherein correspondence between an inode number and a data block is managed, acquiring an inode number that corresponds to a specified file path name from the directory entry when the shredding implementation request therefore is received, and acquiring a data block that corresponds to the acquired inode number from the inode management table and writing the data for shredding on the acquired data block;

a processing part storing into a separate data block that is not a target of a writing process for shredding the selected file entity, used for the pseudo shredding, stored in a data block and updates the inode management table to correspond to a post storing state, at the time data write processing for the shredding, in a case the pseudo shredding is started on the data block that is a target of the write processing; and a processing part storing into a separate data block that is not a target of a writing process for shredding a file entity, used for the pseudo shredding, stored in a data block and performs write processing of data for shredding on the separate data block, at the time data write processing for the shredding, in a case the pseudo shredding is started on the data block that is a target of the write processing, wherein data writing for the shredding on a data block is not performed, in a case a number of updates of the data block that is a target of the pseudo shredding exceeds a preset threshold value after the pseudo shredding has started.

2. A data shredding method that uses an information processing system that receives a data I/O request in units of files, and performs writing or reading of data to/from a storage system that includes a non-transitory computer readable storage medium storing therein a file entity specified as the data I/O request received in units of data blocks, the data shredding method comprising:

causing an information processing system to perform pseudo shredding on the data block by selecting a file whose update frequency exceeds a preset threshold value from files stored in the non-transitory computer readable storage medium and storing a selected file entity in the data block during shredding of a specific data block of the non-transitory computer readable storage medium;

causing an information processing system to receive a data I/O request sent from a client device in units of files, write or read data to/from a storage system that includes a recording medium storing therein a file entity specified as the received data I/O request in units of data blocks;

receive a request to implement shredding in units of files and write data for shredding on the data block storing a file entity specified by the implementation request received;

start the pseudo shredding on the data block that is a target of the data write request in a processing wait status when detecting that a number of the shredding implementation request in queue or an increase thereof exceeds a preset threshold value;

store a directory entry wherein correspondence between a file path name and an mode number is managed, and an inode management table wherein correspondence between an inode number and a data block is managed;

acquire an inode number that corresponds to a specified file path name from the directory entry when the shredding implementation request therefor is received, acquire a data block that corresponds to the acquired inode number from the inode management table and write the data for shredding on the acquired data block;

store into a separate data block that is not a target of a writing process for shredding the selected file entity, used for the pseudo shredding, stored in a data block and updates the inode management table to correspond to a post storing state, at the time data write processing for the shredding, in a case the pseudo shredding is started on the data block that is a target of the write processing;

store into a separate data block that is not a target of a writing process for shredding a file entity, used for the pseudo shredding, stored in a data block and performs write processing of data for shredding on the separate data block, at the time data write processing for the shredding, in a case the pseudo shredding is started on the data block that is a target of the write processing; and not perform data writing for the shredding on a data block, in a case a number of updates of the data block that is a target of the pseudo shredding exceeds a preset threshold value after the pseudo shredding has started.

* * * * *